US011491369B2

(12) United States Patent
Slinkard et al.

(10) Patent No.: US 11,491,369 B2
(45) Date of Patent: Nov. 8, 2022

(54) BAT SPEED MEASURING DEVICE

(71) Applicant: CATALYST SPORTS LLC, Golden, CO (US)

(72) Inventors: Troy Slinkard, Golden, CO (US);
Daniel Bodenstein, Boulder, CO (US);
Austin Glaser, Boulder, CO (US);
Kevin McWilliams, Boulder, CO (US)

(73) Assignee: Catalyst Sports LLC, Golden, CO (US)

(*) Notice: Subject to any disclaimer, the term of this patent is extended or adjusted under 35 U.S.C. 154(b) by 545 days.

(21) Appl. No.: 16/577,998

(22) Filed: Sep. 20, 2019

(65) Prior Publication Data

US 2020/0094108 A1 Mar. 26, 2020

Related U.S. Application Data

(60) Provisional application No. 62/734,077, filed on Sep. 20, 2018.

(51) Int. Cl.
A63B 24/00 (2006.01)
A63B 69/00 (2006.01)
G01P 1/02 (2006.01)
G01P 3/68 (2006.01)

(52) U.S. Cl.
CPC ...... *A63B 24/0006* (2013.01); *A63B 69/0002* (2013.01); *G01P 1/026* (2013.01); *G01P 3/68* (2013.01); *A63B 2220/31* (2013.01); *A63B 2220/36* (2013.01); *A63B 2220/805* (2013.01)

(58) Field of Classification Search
CPC ............ A63B 24/0006; A63B 69/0002; A63B 2220/31; A63B 2220/36; A63B 2220/805; G01P 1/026; G01P 3/68
See application file for complete search history.

(56) References Cited

U.S. PATENT DOCUMENTS

| D278,831 S | 5/1985 | Bressler et al. | |
| 4,515,365 A * | 5/1985 | Horikoshi | A63B 69/0002 434/247 |
| 4,583,733 A * | 4/1986 | Ito | A63B 69/0002 434/247 |

(Continued)

FOREIGN PATENT DOCUMENTS

| WO | WO-2011101459 A1 * | 8/2011 | ......... A63B 24/0021 |
| WO | WO-2012069375 A1 * | 5/2012 | ......... A63B 37/0003 |

(Continued)

OTHER PUBLICATIONS

"SetPro SP-3A Swing Power Training Product", 7 pages.

(Continued)

*Primary Examiner* — Sundhara M Ganesan
(74) *Attorney, Agent, or Firm* — Dorsey & Whitney LLP

(57) ABSTRACT

A bat speed measuring device is including a housing, one or more light emitting assemblies producing light at first and second sensing zones relative to the housing, first and second light receiving assemblies for receiving respective light reflections of the light when a moving object, such as a bat, passes through the first and second sensing zones, and a processor configured to calculate a speed of the object moving between the first and second sensing zones.

19 Claims, 17 Drawing Sheets

(56) References Cited

U.S. PATENT DOCUMENTS

| | | | | |
|---|---|---|---|---|
| 4,814,986 | A | * | 3/1989 | Spielman ............ A63B 71/0605 700/91 |
| 4,915,384 | A | * | 4/1990 | Bear ................. A63B 69/3614 473/154 |
| D367,821 | S | | 3/1996 | Fischer |
| 5,741,182 | A | * | 4/1998 | Lipps ................... A63F 13/812 463/36 |
| 5,833,549 | A | * | 11/1998 | Zur ................... A63B 69/0002 463/36 |
| D409,927 | S | | 5/1999 | Wiegers et al. |
| 5,988,861 | A | * | 11/1999 | Baum ............... A63B 24/0021 73/12.02 |
| 6,095,928 | A | * | 8/2000 | Goszyk ............. A63B 69/3614 345/158 |
| 6,254,492 | B1 | * | 7/2001 | Taggett ............. A63B 69/3623 473/219 |
| 6,292,130 | B1 | * | 9/2001 | Cavallaro ............... G01S 13/87 342/55 |
| 6,304,665 | B1 | * | 10/2001 | Cavallaro .......... A63B 24/0021 382/106 |
| 8,911,309 | B1 | * | 12/2014 | Harihar ............. A63B 71/0622 473/453 |
| 9,092,952 | B1 | * | 7/2015 | Daniel .................... G08B 1/00 |
| 9,744,419 | B1 | * | 8/2017 | Rodriguez ......... A63B 69/0002 |
| 9,956,465 | B1 | * | 5/2018 | Rodriguez ......... A63B 69/3608 |
| 10,874,932 | B1 | * | 12/2020 | Kane ................. A63B 69/0002 |
| 2001/0056000 | A1 | * | 12/2001 | Hori .................. A63B 69/0053 473/453 |
| 2003/0054898 | A1 | * | 3/2003 | Otten ................. A63B 69/3614 473/219 |
| 2007/0021242 | A1 | * | 1/2007 | Krickler ............. A63B 69/0002 473/453 |
| 2007/0225054 | A1 | * | 9/2007 | Okamoto ................ A63F 13/10 463/3 |
| 2008/0070654 | A1 | * | 3/2008 | Okamoto ............. A63F 13/537 463/3 |
| 2009/0203471 | A1 | * | 8/2009 | Roudybush ...... A63B 23/03508 473/424 |
| 2010/0248853 | A1 | * | 9/2010 | Dellinger ........... A63B 69/3614 473/453 |
| 2013/0172129 | A1 | * | 7/2013 | Sams, III ........... A63B 71/0622 473/417 |
| 2013/0346009 | A1 | * | 12/2013 | Winter .................. G01S 13/867 342/55 |
| 2015/0065272 | A1 | * | 3/2015 | Bond ................. A63B 69/3621 473/417 |
| 2015/0157915 | A1 | * | 6/2015 | Brantingham ..... A63B 69/3623 473/140 |
| 2015/0258402 | A1 | * | 9/2015 | Bynum .................. H04M 1/725 473/453 |
| 2016/0296797 | A1 | * | 10/2016 | Rosen .................... A63B 63/00 |
| 2016/0339316 | A1 | * | 11/2016 | Lee .................... A63B 69/0002 |
| 2016/0367847 | A1 | * | 12/2016 | Antunes ............ A63B 71/0622 |
| 2017/0014698 | A1 | * | 1/2017 | Dilz, Jr. .............. A63B 24/0021 |
| 2017/0157484 | A1 | * | 6/2017 | Altshuler ........... A63B 24/0021 |
| 2017/0361165 | A1 | * | 12/2017 | Miller .............. A63B 21/00178 |
| 2018/0071604 | A1 | * | 3/2018 | Tyndall .............. A63B 24/0021 |
| 2018/0250570 | A1 | * | 9/2018 | Yarborough ....... A63B 69/0002 |
| 2018/0272214 | A1 | * | 9/2018 | Ratner ............... A63B 69/0002 |
| 2018/0290037 | A1 | * | 10/2018 | Dilz, Jr. ................. G01S 13/583 |
| 2018/0311555 | A1 | * | 11/2018 | Danis ................. A63B 71/0622 |
| 2019/0022487 | A1 | * | 1/2019 | Joo .................... A63B 71/0622 |
| 2019/0269987 | A1 | * | 9/2019 | Kim ....................... A63B 71/04 |
| 2019/0324423 | A1 | * | 10/2019 | Kim .......................... G06T 7/20 |
| 2021/0031086 | A1 | * | 2/2021 | Tabuchi ............. A63B 24/0003 |
| 2021/0197049 | A1 | * | 7/2021 | Penrod ................ H05B 47/105 |
| 2022/0032155 | A1 | * | 2/2022 | Cox ................... A63B 69/0002 |

FOREIGN PATENT DOCUMENTS

| | | | | |
|---|---|---|---|---|
| WO | WO-2013105726 | A1 | * | 7/2013 ............. A63B 69/36 |
| WO | WO-2014147639 | A2 | * | 9/2014 ......... A63B 69/3614 |
| WO | WO-2018094457 | A1 | * | 5/2018 |

OTHER PUBLICATIONS

SETPRO, "Reaction Training Your Home Run Advantage", http://www.setpro.com/finalwebsite/Main%20html/Hitting/Hitting%20Brochure%20Page%2000%20Reaction%201.htm, (Accessed Jul. 3, 2018), 3 pages.

SETPRO, "Who is Paul Nyman", www.setpro.com, (Accessed Jul. 3, 2018), 7 pages.

* cited by examiner

BAT SPEED MEASURING DEVICE

PRIORITY

This application claims priority to U.S. Provisional Appl. No. 62/734,077 filed on 20 Sep. 2018, which is incorporated by reference herein, in the entirety and for all purposes.

TECHNICAL FIELD

The present disclosure relates to speed measuring devices, and more specifically to speed measuring devices used in sporting applications.

BACKGROUND

Many configurations of speed measuring devices exist to calculate the speed of an object moving past a stationary device. Some devices include analog or other complicated and/or outdated components to measure speed that may result in inaccurate readings, or in presentation of the readings in less than desirable manners. Some devices are also limited in how speed data is presented. For instance, many devices include a single display that presents speed data to only the users within visual proximity of the single display.

The information included in this Background section of the specification, including any references cited herein and any description or discussion thereof, is included for technical reference purposes only and is not to be regarded subject matter by which the scope of the invention as defined in the claims is to be bound.

SUMMARY

The technology disclosed herein relates to devices and methods for determining the speed of an object moving thereby. More specifically, the present disclosure is directed to training devices and methods of calculating the speed of a player's swing for use in baseball, tennis, golf, lacrosse, hockey, field hockey, hurling, axe or hammer throwing, or other sport-based training.

According to one aspect, a speed measuring device is provided. The speed measuring device may include a housing, one or more light emitting assemblies producing light at first and second sensing zones relative to the housing, first and second light receiving assemblies for receiving respective light reflections of the light when a moving object passes through the first and second sensing zones, and a processor configured to calculate a speed of the object moving between the first and second sensing zones.

Optionally, the first and second light receiving assemblies may collimate the light reflections. The one or more light emitting assemblies may produce collimated light fields at the first and second sensing zones.

Optionally, the one or more light emitting assemblies may include a first light emitting assembly paired to the first light receiving assembly and a second light emitting assembly paired to the second light receiving assembly. The first light emitting assembly may include a first plurality of light emitting diodes. The second light emitting assembly may include a second plurality of light emitting diodes.

Optionally, each light receiving assembly may include a collector housing and one or more photodiodes positioned adjacent to the collector housing for detecting the light reflections passing through the collector housing. Each collector housing may condition the light reflections received therein.

Optionally, the speed measuring device may include a plurality of displays electrically coupled to the processor to display the speed of the object moving between the first and second sensing zones. The plurality of displays may include first and second displays positioned on opposing sides of the housing.

Optionally, the first and second sensing zones may have a vertical fan shape defined between a lower sensing line and an upper sensing line. The upper sensing line may extend upwardly away from the housing. The lower sensing line may extend downwardly away from the housing. The lower sensing line may extend upwardly away from the housing. The angle between the upper and lower sensing lines may be between 15 degrees and 75 degrees.

According to another aspect, a speed measuring device is provided. The speed measuring device may include a first light emitting assembly forming a first light field at a first sensing zone, a first light receiving assembly for receiving and collimating reflection light when an object passes through the first sensing zone, a second light emitting assembly forming a second light field at a second sensing zone, a second light receiving assembly for receiving and collimating reflection light when the object passes through the second sensing zone, and a processor in electrical communication with the first and second light receiving assemblies and configured to calculate a speed of the object moving between the first and second sensing zones.

Optionally, the speed measuring device may include a plurality of displays electrically coupled to the processor to display the speed of the object moving between the first and second sensing zones. The speed measuring device may include a housing. The first and second sensing zones may be located along a length of the housing.

Optionally, each of the first light receiving assembly and the second light receiving assembly may include a collector housing arranged to receive and collimate the reflection light received therein. Each of the first light receiving assembly and the second light receiving assembly may include one or more photodiodes positioned adjacent to an opening of the collector housing to detect the collimated light passing through the collector housing. Each light receiving assembly may include a single photodiode. The single photodiode may be positioned centrally relative to a length of the collector housing. The single photodiode may be positioned centrally relative to a width of the collector housing. The collector housing may be arranged symmetrically across its width.

Optionally, the first light receiving assembly may be matched to the first light emitting assembly. The second light receiving assembly may be matched to the second light emitting assembly.

According to another aspect, a speed measuring device is provided. The speed measuring device may include a housing, a first matched pair of a light emitting assembly and a light receiving assembly connected to the housing at a first position, and a second matched pair of a light emitting assembly and a light receiving assembly connected to the housing at a second position. The first matched pair may be configured to detect the presence of an object at a first sensing zone relative to the housing. The second matched pair may be configured to detect the presence of the object at a second sensing zone relative to the housing. The speed measuring device may include a processor, a first display, and a second display. The processor may be configured to calculate a speed of the object moving between the first and second sensing zones. The first display may be positioned on a first panel of the housing. The first display may be electrically coupled to the processor to display the speed of the object moving between the first and second sensing zones. The second display may be positioned on a second panel of the housing. The second display may be electrically coupled to the processor to display the speed of the object moving between the first and second sensing zones.

Optionally, the first and second matched pairs may be connected to the first panel of the housing. The first display may be positioned between the first and second matched pairs.

Optionally, the speed measuring device may include input elements connected to the housing. The input elements may be associated with one of the first display and the second display. The input elements may be connected to the housing on a side different than the first and second matched pairs.

Optionally, the object includes a reflector. In some examples, light from the first light field is reflected off of the reflector as the object passes through the first sensing zone, and light from the second light field is reflected off of the reflector as the object passes through the second sensing zone.

According to another aspect, a method of determining the speed of an object passing alongside a speed measuring device is provided. The method may include emitting by one or more light emitting diodes a first light field from a first light emitting assembly at a first sensing zone, emitting by one or more light emitting diodes a second light field from a second light emitting assembly at a second sensing zone, collecting by a first collector housing light beams of the first light field reflected by an object passing through the first sensing zone, and collecting by a second collector housing light beams of the second light field reflected by the object passing through the second sensing zone. The method may further include generating by one or more photodiodes a digital signal representing the light beams collected by the first light receiving assembly, and generating by one or more photodiodes a digital signal representing the light beams collected by the second light receiving assembly. The method may further include determining by a processor the times at which the object passes through the first and second sensing zones, and calculating by the processor a speed of the object moving between first and second sensing zones.

Optionally, the method may include filtering by the processor the digital signals representing the light beams collected by the first and second light receiving assemblies. Filtering the digital signals may include passing the digital signals through a low pass filter and/or passing the digital signals through a high pass filter. Filtering the digital signals may include detecting a carrier wave signal produced by at least one of the light emitting diodes.

Optionally, determining the times at which the object passes through the first and second sensing zones may include determining the times at which one or more signal spikes are presented in the digital signals. Determining the times at which the object passes through the first and second sensing zones may include determining the times at which a peak, rising edge, or falling edge of the one or more signal spikes is present in the digital signals.

Optionally, the method may include displaying the calculated speed on a plurality of displays electrically coupled to the processor.

Optionally, the method may include collecting light beams reflected by a reflector on the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various examples and implementations and illustrated in the accompanying drawings.

DETAILED DESCRIPTION

Figure 1:
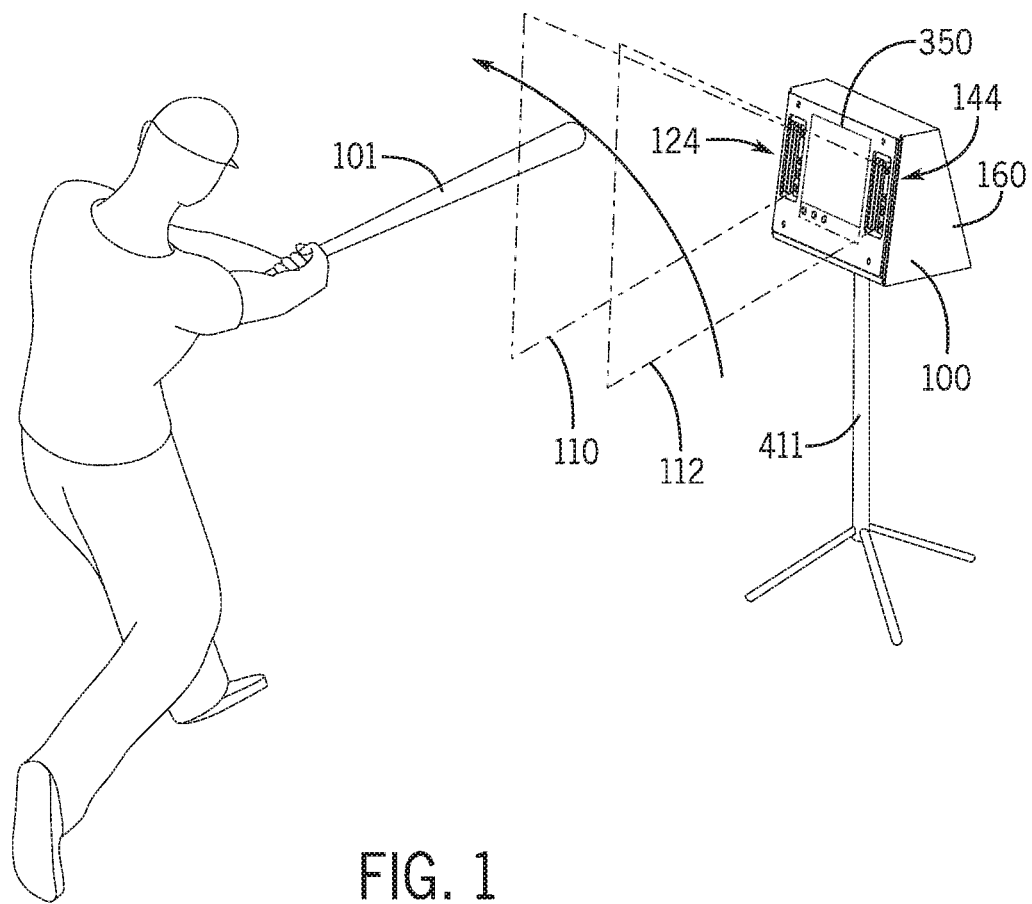
FIG. 1 is a perspective view of a speed measuring device in use to calculate a speed of an object moving past the device according to some examples of the present disclosure.

The present disclosure relates to a speed measuring device for calculating the speed of an object, such as a bat, club, racket, stick, hurl, paddle, axe, hammer, or the like, moving past the device. The speed measuring device may include one matched pair, or a plurality of matched pairs, of light emitters and light collectors (also referred to as receivers) for detecting the presence of an object at defined sensing zones. Knowing the distance between the sensing zones, the speed measuring device calculates the speed of the moving object based on the detected times the object is positioned in the different sensing zones. The calculated speed is then presented to the user as feedback. The user can use this speed data in a training regime in an effort to improve desired performance related to speed. For example, the user can attempt to break previous speed related thresholds, such as maximum speed, average speed records, or the like. The speed measuring device may store the speed data (e.g., maximum speed, average speed, etc.) for feedback to the user, such as by a display or other means. In contrast with some previous designs, the speed measuring device may include one or more displays, such as a plurality of displays, to present the calculated speed or previous speed related thresholds to the user, whether instantaneously as the object moves past the device and/or at a later time for analysis or review.

The speed measuring device may be set up to measure the object speed, for example the bat speed, of a series of swings and show the results on the first display 350, the second display 352, or both the first and second displays. In some examples, a series of swings may include two, three, four, five, six, seven, eight, nine, ten or more individual swings in a row. In some examples, the speed measuring device may display the mean or average bat speed measured of the series of individual swings. For example, the device could measure a series of 5 individual swings in a row and show the average bat speed. A series of swings may be formed into a set. For example, the series of 5 swings may make up one set. In some examples, the speed measuring device may measure multiple sets of individual series of swing speeds, and then show the average speed of each set, as well as the overall average of the swing speeds across all sets. For example, the speed measuring device could measure 3 sets of 5 swing speeds, and then display the average speed of the first set, the second set, and the third set, as well as display the average of the 15 total swing speeds. In some examples, the speed measuring device may display the minimum and maximum speed measured in the series of swings. In some examples, the speed measuring device may display additional statistical information regarding the series or set of series of swing speeds, such as the median or mode of the measured speed. In some examples, the device could measure and display the mean, median, and mode speed of the series or set of series having removed the data associated with outlier individual swing speeds, such as the highest and lowest swing speeds measured from the series or set of series. Throughout, reference to swing speed or bat speed refers to the speed of the object passing by the swing speed measurement device.

Figure 2:
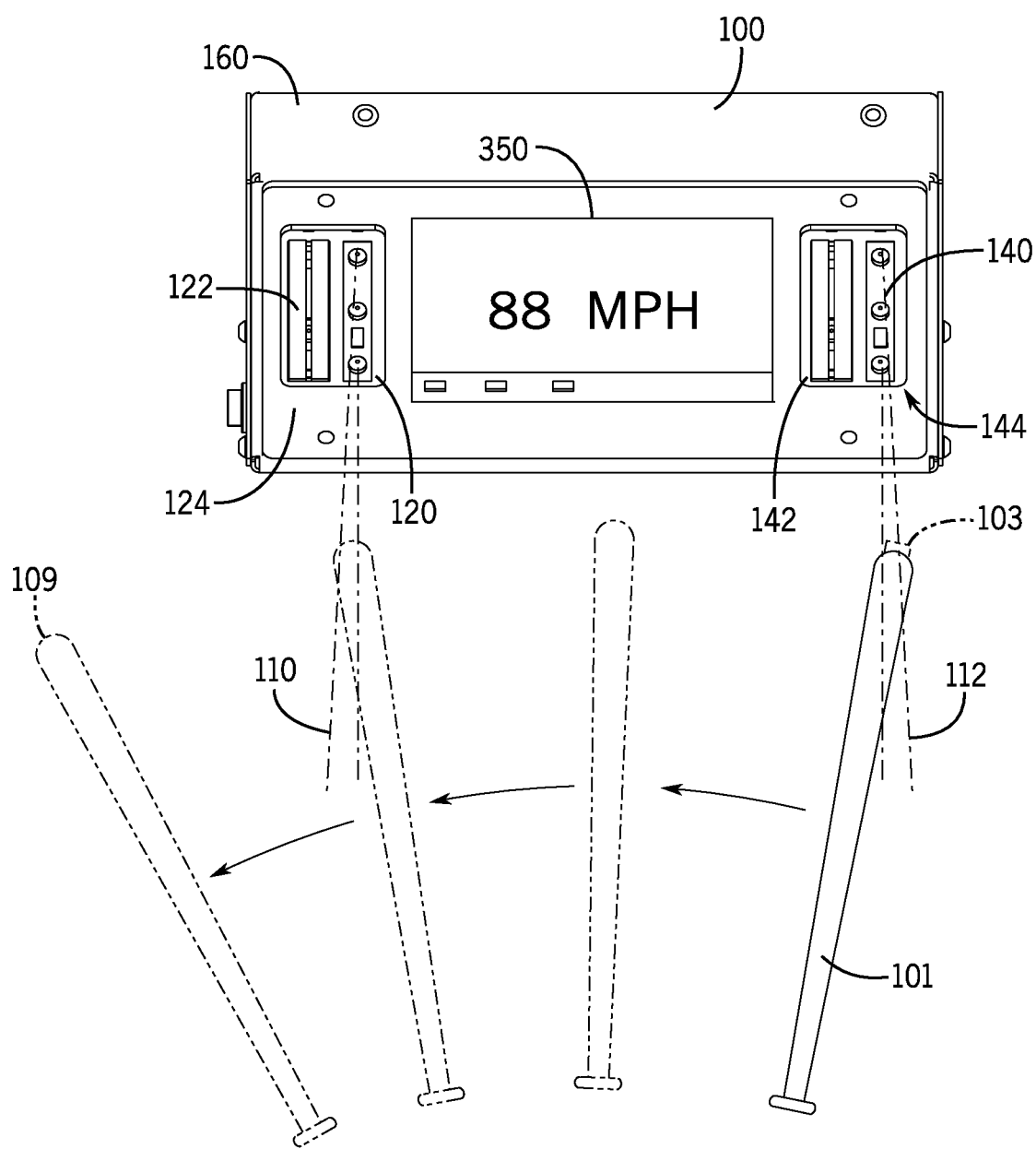
FIG. 2 is a top plan view of the speed measuring device of FIG. 1 and showing the device measuring a speed of an object moving past the device.
Figure 3:
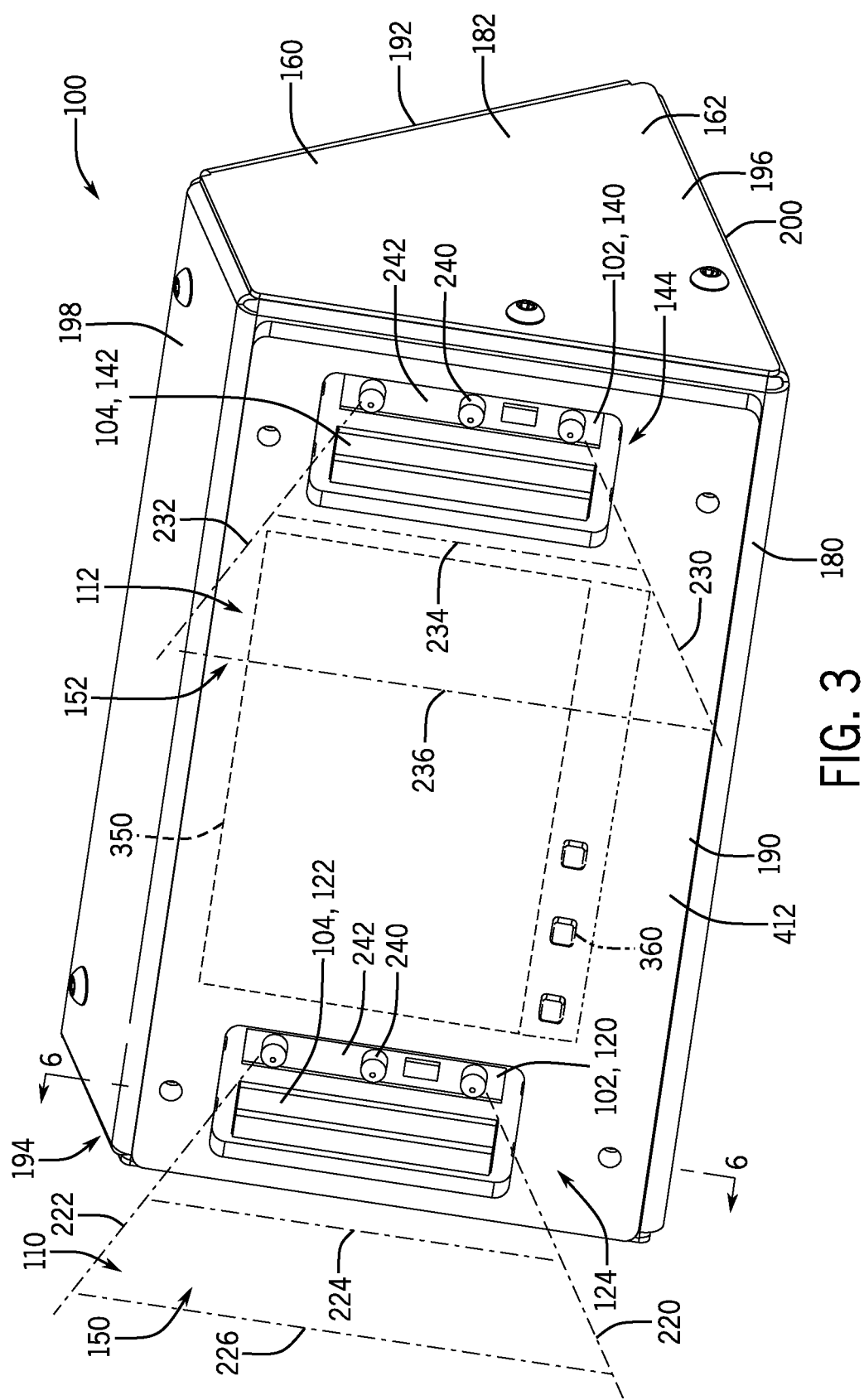
FIG. 3 is a top, front isometric view of the speed measuring device of FIG. 1.
Figure 4:
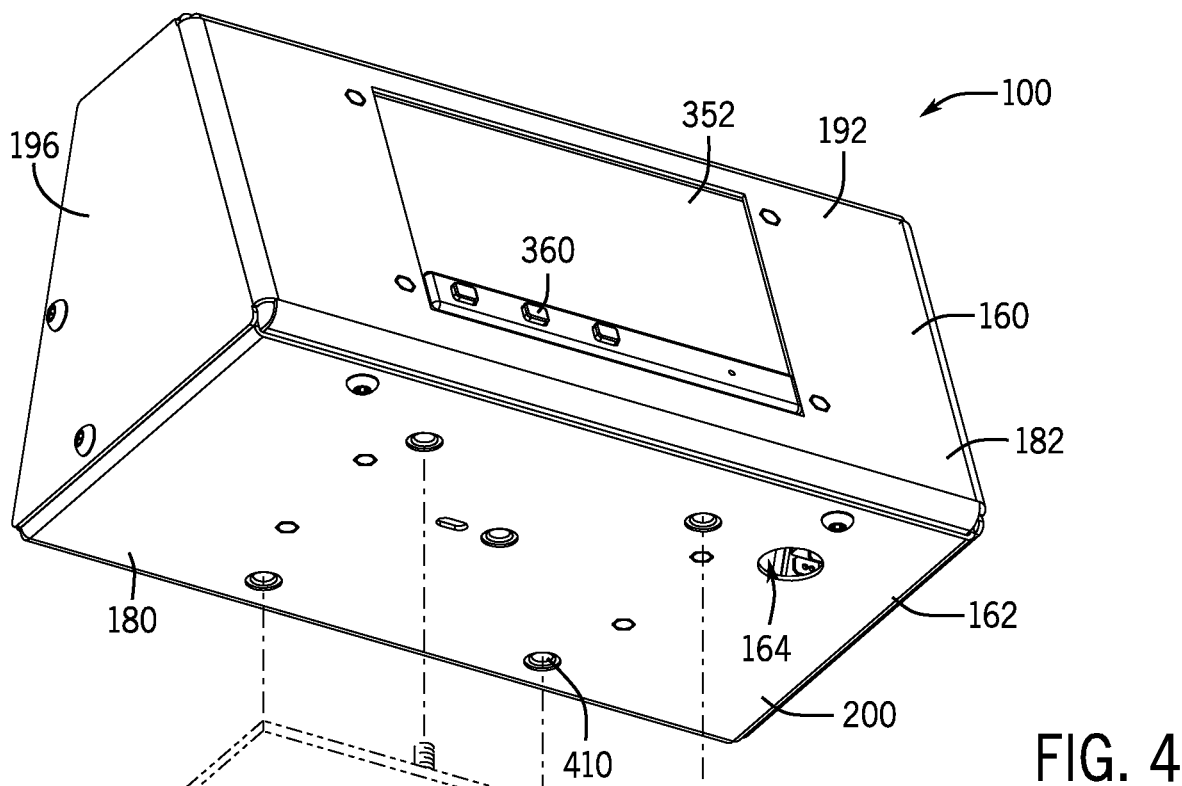
FIG. 4 is a bottom, rear isometric view of the speed measuring device of FIG. 1.
Figure 5:
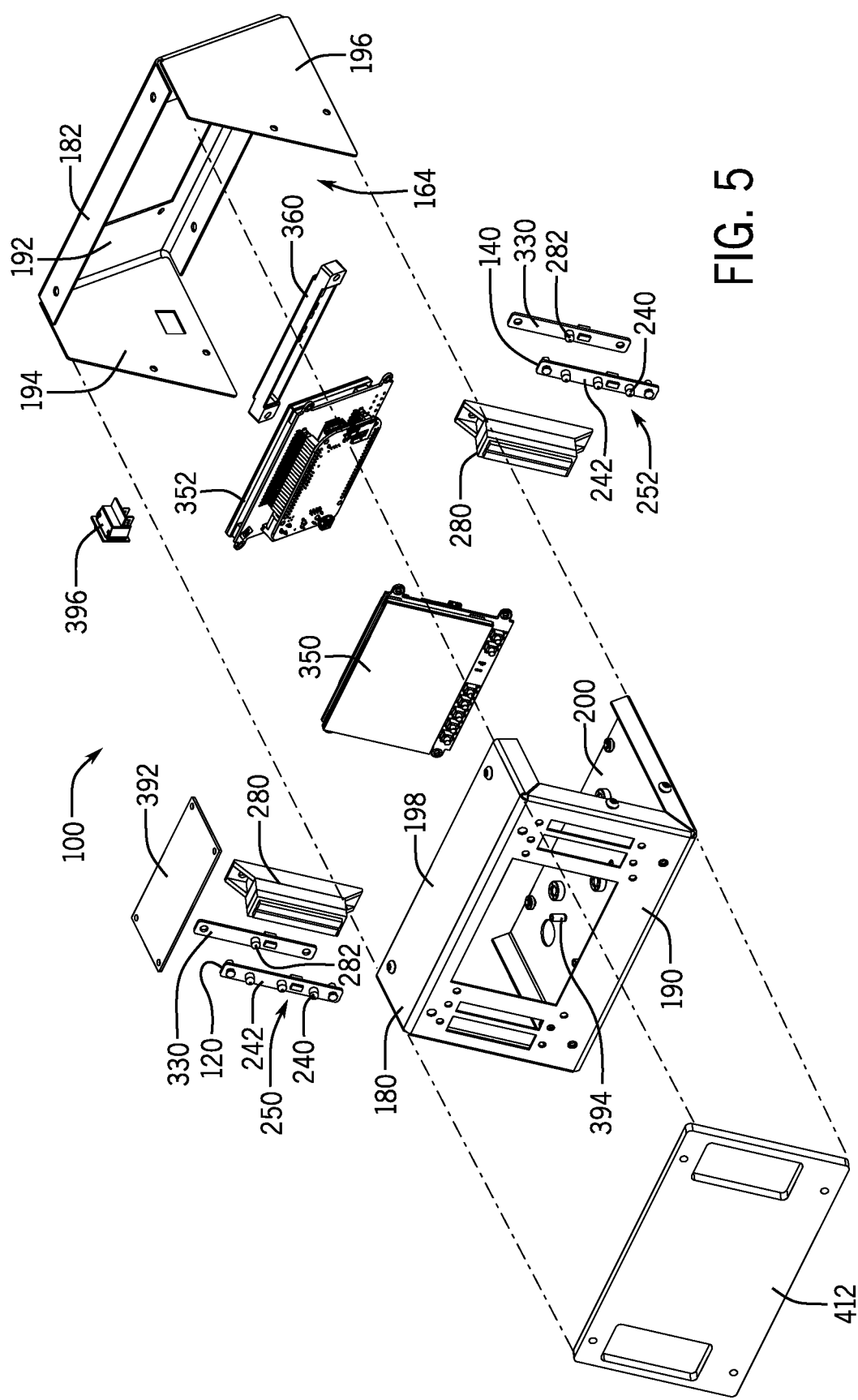
FIG. 5 is an exploded view of the speed gathering device of FIG. 1.

Turning to the figures, illustrative examples of the present disclosure will now be discussed in detail. FIG. 1 is a perspective view of a speed measuring device 100 in use to calculate a speed of an object 101 moving past the device 100. FIG. 2 is a top plan view of the speed measuring device 100 measuring a speed of the object 101, which may be a bat, club, racket, stick, hurl, paddle, axe, hammer, or the like. FIG. 3 is a top, front isometric view of a speed measuring device 100. FIG. 4 is a bottom, rear isometric view of the speed measuring device 100. FIG. 5 is an exploded view of the speed measuring device 100. As shown, the speed measuring device 100, which may be referred to as a speed calculating device, a speed determining device, a speed training device, or the like, includes one or more light emitting assemblies 102 for producing or emitting light, and one or more light receiving assemblies 104 for receiving or collecting the emitted light when reflected off of a moving object 101. As explained more fully below, each light emitting assembly 102 may form a light field to define a sensing zone to detect the presence of an object 101 passing through the respective sensing zone.

The speed measuring device 100 may include a plurality of sensing zones such that a speed of the object 101 moving past the device may be determined as the object 101 passes through the sensing zones, such as in order or serially. In such examples, when the object 101 passes through a first sensing zone 110, the light emitted by a first light emitting assembly 120 may impinge upon the object 101 and be reflected off of the object 101. Depending on the particular application, the object 101 may be configured to enhance the light reflected off of the object 101. For example, the object 101 may be at least partially made of highly reflective material or have a highly reflective surface (such as a smooth or polished surface). In some examples, a reflector 103 (FIG. 2), in some examples reflective tape, may be attached to or otherwise placed on the object 101, such as on or near the end of a object 101, such as a bat, stick, club, hurl, or racket, to enhance, strengthen, or increase the intensity of the reflected light, as further described below.

A portion of the light reflected off of the object 101 may be reflected towards a first light receiving assembly 122. The first light receiving assembly 122 may receive and sense the reflected light when the object 101 is positioned in (while passing through) the first sensing zone 110. The same or similar process occurs when the object 101 passes through a second sensing zone 112 formed by a second light emitting assembly 140 and is sensed by a second light receiving assembly 142. The speed of the object 101 is measured by determining the time it takes the object 101 to pass between each of the first and second sensing zones 110, 112, and dividing that time difference by the known linear distance between the sensing zones.

As detailed below, the speed measuring device 100 may be configured to calculate the speed of the object 101 moving between the sensing zones based on receipt of the reflected light by the light receiving assembly 104 associated with each sensing zone. For instance, reflected light may be received and sensed by the one or more light receiving assemblies 104 when the object 101 is at the first sensing zone 110, which defines or marks a Time 1, and at the second sensing zone 112 at Time 2. Knowing the distance between the first and second sensing zones 110, 112, the speed measuring device 100 may use the difference between Time 1 and Time 2 to calculate the speed of the object 101 moving between the sensing zones, as described more fully below.

Though described as having a pair of light emitting assemblies 102 paired to two light receiving assemblies 104, the speed measuring device 100 may include any number of light emitting assemblies 102 and light receiving assemblies 104, such as a single light emitting assembly 102 and a plurality of light receiving assemblies 104, a plurality of light emitting assemblies 102 and a single light receiving assembly 104, or a single light emitting assembly 102 and a single light receiving assembly 104, among others. In one example, the first and second light emitting assemblies 102 may be a single emitter. In such examples, the light emitted from a single light emitting assembly 102 may form a plurality of sensing zones to mark time through the sensing zones to determine speed.

With continued reference to FIGS. 1-3, the speed measuring device 100 may include a first light emitting assembly 120 paired to a first light receiving assembly 122 to define a first matched pair 124. In some examples, the speed measuring device 100 may include a second light emitting assembly 140 paired to a second light receiving assembly 142 to define a second matched pair 144. The first matched pair 124 may be configured to detect the presence of the object 101 at one or more sensing zones, such as at the first sensing zone 110. Similarly, the second match pair may be configured to detect the presence of the object 101 at one or more sensing zones, such as at the second sensing zone 112. The first and second matched pairs 124, 144 may be configured to detect the object 101 at respective sensing zones. For example, as explained below, the first matched pair 124 may be configured, whether by structure, digital signal filtering, or otherwise, to detect the presence of the object 101 when positioned at only the first sensing zone 110. Similarly, the second matched pair 144 may be configured, whether by structure, digital signal filtering, or otherwise, to detect the presence of the object 101 when positioned at only the second sensing zone 112. Alternatively, the first and second matched pairs 124, 144 may be configured to detect the object 101 at each sensing zone, such as for redundancy and/or accuracy purposes.

As described herein, the first light emitting assembly 120 may form a first light field 150 defining the first sensing zone 110, and the second light emitting assembly 140 may form a second light field 152 at defining the second sensing zone 112. In such examples, the first light receiving assembly 122 may receive reflected light 154 when an object 101 passes through the first sensing zone 110. Similarly, the second light receiving assembly 142 may receive reflected light 156 when the object 101 passes through the second sensing zone 112. Depending on the particular application, the first light receiving assembly 122 may collimate the reflected light 154 of the first light field 150 reflected by the object 101 at the first sensing zone 110. In like manner, the second light receiving assembly 142 may collimate the reflected light 156 of the second light field 152 reflected by the object 101 at the second sensing zone 112. For example, as explained below, the first and second light receiving assemblies 140, 142 may be sized and shaped to receive the reflected light 154, 156 only when the object 101 passes through at least a portion of the sensing zones 110, 112.

Referring to FIGS. 1-3, the one or more light emitting assemblies 102 and the one or more light receiving assemblies 104 may be positioned relative to a housing 160, such as in one example positioned at least partially within the housing 160. The housing 160 may include a plurality of walls 162 defining an enclosed space 164 therein. As shown, the housing 160 has a length L, a width W, and a height H. In such examples, the distance between the first and second sensing zones 110, 112 may be less than the length L of the housing 160. The distance between the first and second sensing zones 110, 112 may be generally the distance between the first and second light emitting assemblies 120, 140. Thought the first and second light emitting assemblies 120, 140 may be spaced apart a distance less than the length L of the housing 160, the first and second sensing zones 110, 112 may be spaced apart further than the length L of the housing 160. For example, at least one of the first and second light emitting assemblies 120, 140 may be angled outwardly. In some examples, at least one of the first and second light emitting assemblies 120, 140 may be angled inwardly. At least one of the light emitting assemblies 120, 140 may project light generally orthogonal to the housing 160.

Depending on the particular application, the length L of the housing 160 may be greater than its width W and height H. In some examples, the height H of the housing 160 may be greater than its width W. The walls 162, which may be substantially planar or arcuate along their respective dimensions, may be arranged relative to one another in many configurations to define a particular shape of the housing 160, which may provide an aesthetic and/or functional characteristic of the speed measuring device 100. For instance, the speed measuring device 100 may be a fully-contained unit with sufficient internal volume within the housing 160 to internally accommodate all of device's components.

The housing 160 may include a plurality of housing portions connected together. For instance, as shown in FIG. 5, the housing 160 may include first and second housing portions 180, 182 that define the enclosed space 164 when connected together. In such examples, the first and second housing portions 180, 182 may be coupled together, whether removably or otherwise. For instance, a plurality of fasteners, such as screws, bolts, or the like, may removably connect the first and second housing portions 180, 182 together. The first and second housing portions 180, 182 may be connected together in other manners. For instance, the first and second housing portions 180, 182 may be connected together via adhesive, corresponding retention features, heat or sonic welding, or the like.

Once assembled, the housing 160 may include a first panel 190 and a second panel 192. Depending on particular application, the first and second panels 190, 192 may define opposite sides of the housing 160, adjacent sides of the housing 160, or otherwise. In one example, the first housing portion 180 may define the first panel 190 of the housing 160, and the second housing portion 182 may define the second panel 192 of the housing 160, though other configurations are contemplated, such as one of the housing portions (e.g., the first housing portion 180) defining both the first and second panels 190, 192 of the housing 160. In one example, the first panel 190 of the housing 160 may be a front side of the speed measuring device 100, and the second panel 192 of the housing 160 may be a rear or back side of the speed measuring device 100 opposite the first panel 190. In such examples, the housing 160 may include end panels defining opposing left and right panels 194, 196 of the speed measuring device 100. As shown, the housing 160 may also include opposing top and bottom panels 198, 200 of the speed measuring device 100. Though the first and second panels 190, 192 are illustrated as being the front and rear sides of the speed measuring device 100, the first and second panels 190, 192 may be any of the other sides of the device, such as the top panel 198, the bottom panel 200, the left panel 194, or the right panel 196 of the speed measuring device 100.

In examples utilizing a housing 160, the sensing zones may be defined relative to the housing 160. For instance, the first matched pair 124 may be connected to the housing 160 at a first position, such as along the first panel 190 of the housing 160 near the left panel 194. Similarly, the second matched pair 144 may be connected to the housing 160 at a second position, such as along the first panel 190 of the housing 160 near the right panel 196. In such examples, the first and second matched pairs 124, 144 may be spaced away from each other along the first panel 190 of the housing 160. For instance, the first and second matched pairs 124, 144 may be spaced away from each other between about 10 cm and about 20 cm, though other configurations are contemplated. The distance between the first and second matched pairs 124, 144 may be measured between the respective emitters or collectors of the matched pairs.

The housing 160 may be sized and shaped based on the desired functional characteristics of the speed measuring device 100. For instance, the housing 160 may be sized and shaped to position the light emitting assemblies 102 and/or the light receiving assemblies 104 in a desired location to detect and calculate the speed of an object 101, such as to detect movement of a bat, racket, club, stick, hurl, paddle, axe, hammer, among others, along a path, such as a player's swing. In the examples shown in FIGS. 1-3, the light emitting assemblies 102 and the light receiving assemblies 104 may be connected to the first panel 190 of the housing 160. In this manner, the speed measuring device 100 may calculate the speed of the object 101 moving alongside or adjacent to the first panel 190 of the housing 160.

In some examples, the object may include a reflector 103. In some examples, the reflector is coupled or attached to the object. In some examples, the reflector is integrally formed with the object. In some examples, the reflector may have an overall shape that is optimized for the object the reflector is integrally formed on, positioned on, or coupled to, or for the physical activity the object is used within. In some examples, the reflector may be circular, oval, square, rectangular, symmetrical or oblong. In some examples, the reflector may include a pattern with areas of reflection and areas of non-reflection or absorption. In one example, the reflector 103 is a portion of reflective tape positioned on the terminal end 109 of object 101, such as a bat, (also sometimes referred to as the "tip" of the bat) to enhance the reflection of the reflected light as the end 109 of the bat 101 passes through the sensing zones 110, and 112.

The first and second sensing zones 110, 112 may be shaped or dimensioned to detect the object 101 as it passes through a space or area defined by the sensing zones. In some examples, the first and second sensing zones 110, 112 may include outer limits wherein the detection of the object 101 is accurate within a desired tolerance threshold. For example, as shown in FIG. 3, the first sensing zone 110 may have a vertical truncated fan shape defined between a lower sensing line 220, an upper sensing line 222, an inner sensing line 224, and an outer sensing line 226. The second sensing zone 112 may have a similar shape, with a lower sensing line 230, an upper sensing line 232, an inner sensing line 234, and an outer sensing line 236. The upper sensing lines 222, 232 may extend upwardly away from the housing 160, such as upwardly and laterally away from the first panel 190 of the housing 160. Similarly, the lower sensing lines 220, 230 may extend laterally away from the first panel 190 of the housing 160. Depending on the particular application, the lower sensing lines 220, 230 may also extend upwardly or downwardly away from the housing 160. The angle between the upper sensing lines 222, 232 and the lower sensing lines 220, 230 of each sensing zone may be an acute angle. For example, the angle between the upper sensing lines 222, 232 and the lower sensing line 220, 230 may be between about 15 degrees and about 75 degrees, though other angles are contemplated.

The first and second sensing zones 110, 112 may extend away from the housing 160 between about 6 inches and about 30 inches to account for various swing paths of the object 101. This distance may be defined between the inner and outer sensing lines 224, 234, 226, 236 of the sensing zones. The first and second sensing zones 110, 112 may be shaped similarly or may vary between sensing zones. The speed measuring device 100 may not be able to detect the object 101 when positioned within the minimum distance as defined by the inner sensing lines 224, 234. Similarly, the maximum distance as defined by the outer sensing lines 226, 236 may define the furthest position away from the housing 160 where effective measurements are no longer possible.

Referring to FIGS. 1-3, the light emitting assemblies 102 will now be discussed in detail. The light emitting assemblies 102 may include many configurations operable to project a light field outwardly away from the housing 160 of the speed measuring device 100. As an example, each light emitting assembly 102 may include one or more light emitting diodes 240, such as a plurality of light emitting diodes, connected to a plate 242 attachable to the housing 160. For instance, the first light emitting assembly 120 may include a first plurality of light emitting diodes 250, and the second light emitting assembly 140 may include a second plurality of light emitting diodes 252. Depending on the particular application, the first plurality of light emitting diodes 250 may be greater than, equal to, or less than the second plurality of light emitting diodes 252. In the examples shown in FIGS. 1-3, each light emitting assembly 102 includes three light emitting diodes 240 arranged linearly along the plate 242, though other configurations are contemplated. Depending on the particular application, the light emitting diodes 240 may be spaced equidistantly apart from one another along the plate 242. In one example, the first light emitting assembly 120 may be configured similarly to the second light emitting assembly 140. In other examples, the first light emitting assembly 120 may be configured differently than the second light emitting assembly 140.

The light emitting assemblies 102 may be configured to project many wavelengths of light therefrom. For example, each light emitting assembly 102 may be configured to emit light within the infrared spectrum. Specifically, each light emitting assembly 102 may project infrared light with wavelengths between about 700 nanometers and about 1000 nanometers, such as between about 800 nanometers and about 900 nanometers. These wavelengths are by example only, and other wavelengths are contemplated, including wavelengths within the ultraviolet, visible light, laser visible spectrum, or microwave spectrum, among others.

As explained below, the light emitting assemblies 102, and specifically the light emitting diodes 240, may produce a carrier wave signal in their projection of light. This carrier wave signal may be used as a marker to verify that the light received by the light receiving assemblies 104 is indeed the light produced by the light emitting assemblies 102 as reflected off of the moving object 101. For instance, only when the carrier wave signal is detected by the light receiving assemblies 104 will the speed measuring device 100 register that an object 101 is at or is passing through the one or more sensing zones. In this manner, the speed measuring device 100 may be able to filter out any noise or other gathered light (such as sunlight and other light sources) to accurately detect the presence of a moving object 101 near the speed measuring device 100 as well as calculate its speed moving thereby, as detailed below.

The light emitting assemblies 102 may project light in many configurations. For example, the light emitting assemblies 102 may be arranged to project light in a collimated manner to accurately define the sensing zones relative to the housing 160. The collimated light may also enhance the strength of reflected light for better, more reliable sensing by the light receiving assemblies 104. In one example, the light from the light emitting assemblies 102 may be projected in a narrow beam, a narrow column, a fan shape, or otherwise. In this manner, the light emitting assemblies 102 may produce collimated light fields at the first and second sensing zones 110, 112. By narrowing or focusing the light, the speed calculations may be more accurate as the sensing zones are better defined. In some examples, the light from the light emitting assemblies 102 may be projected in a general flood-like manner. In such examples, the sensing zones may be defined by the light receiving assemblies 104, as described below. In some examples, the light emitting assemblies 102 may be offset within the light receiving assemblies 104 to create a distinctly shaped light field for better sensing.

Figure 6:
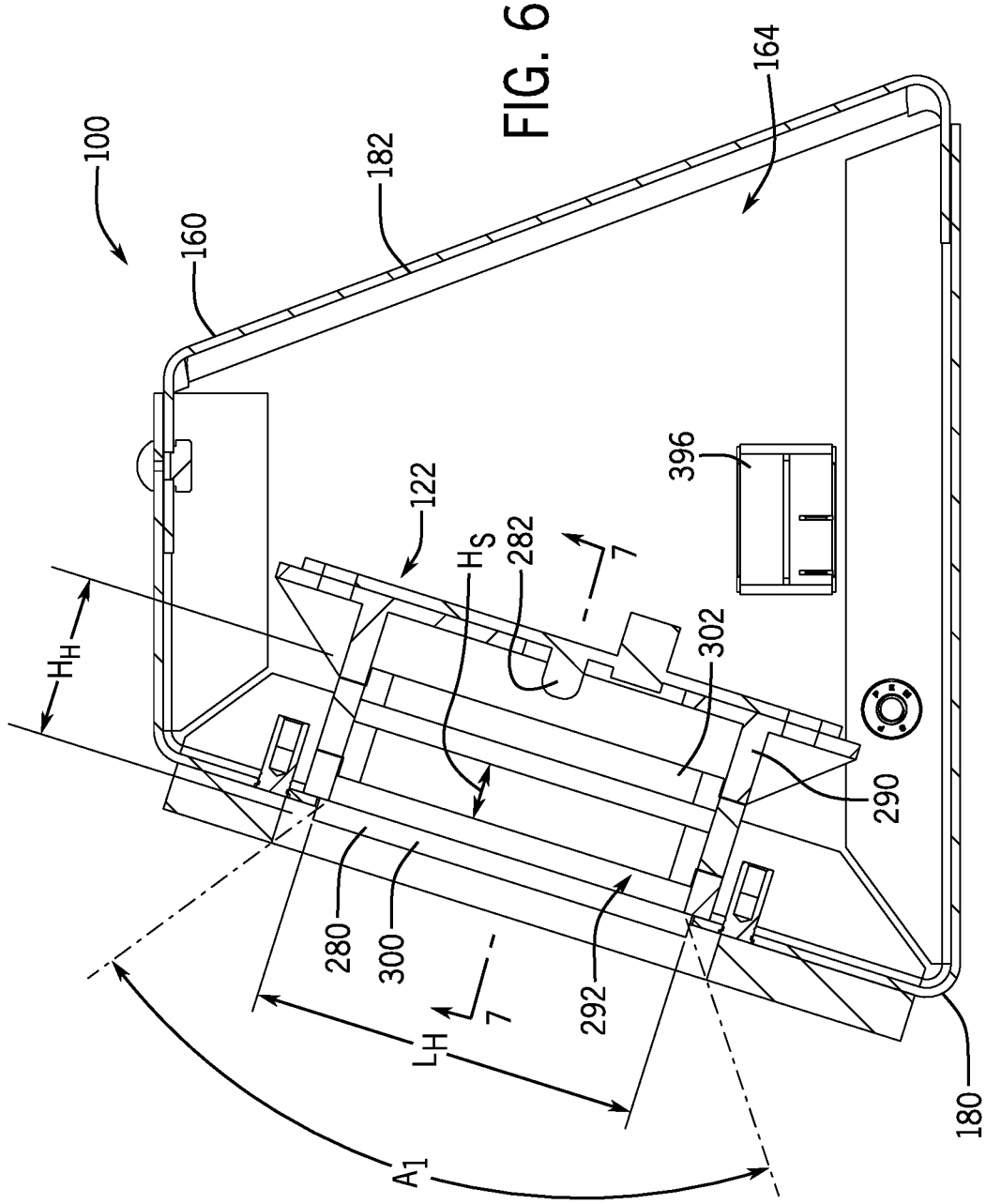
FIG. 6 is a longitudinal cross-sectional view of a light receiving assembly of the speed measuring device of FIG. 1 according to some examples of the present disclosure.
Figure 7:
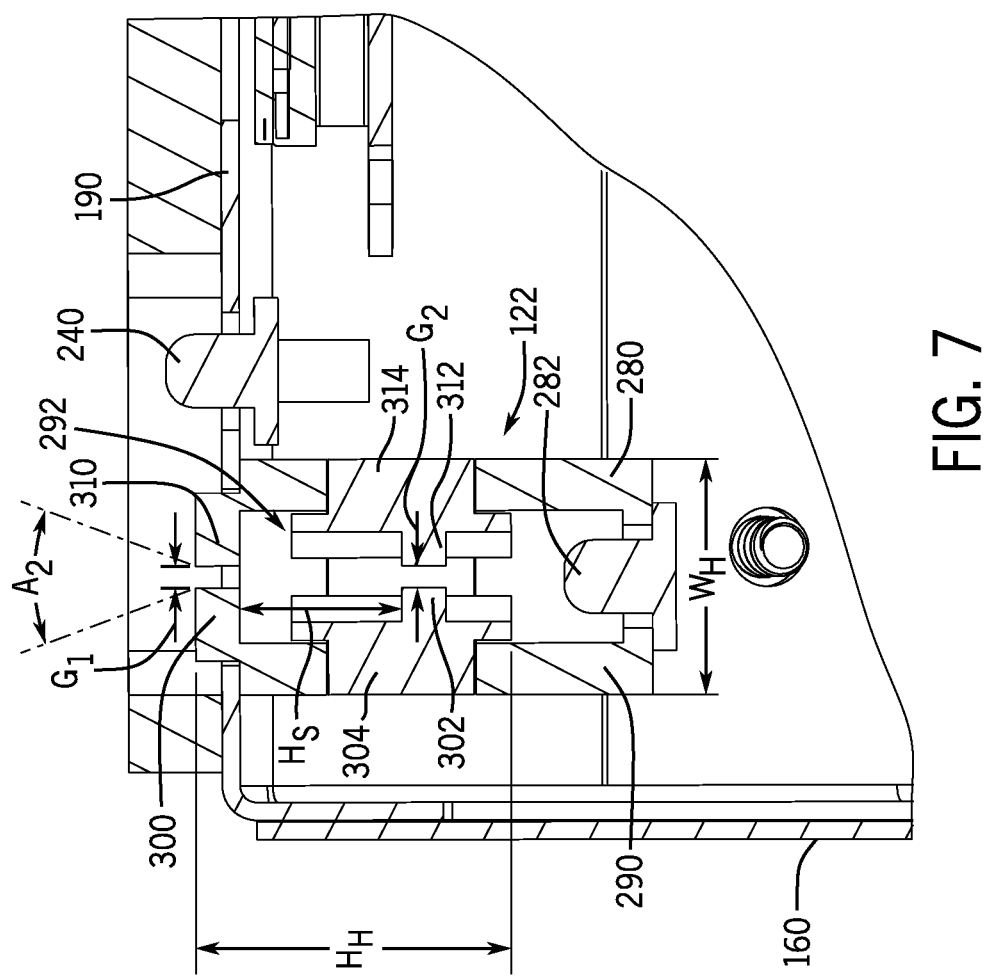
FIG. 7 is a transverse cross-sectional view of the light receiving assembly according to some examples of the present disclosure.

FIG. 6 is a longitudinal cross-sectional view of the first light receiving assembly 122, with the second light receiving assembly 142 configured similarly. FIG. 7 is a transverse cross-sectional view of the first light receiving assembly 122, with the second light receiving assembly 142 configured similarly. Referring to FIGS. 3-5, each light receiving assembly 104 includes a collector housing 280 and one or more photodiodes 282 positioned adjacent to the collector housing 280 for detecting the reflected light passing through the collector housing 280. As described herein, the collector housing 280 may condition the light reflections received therein. In one example, the collector housing 280 may collimate the reflected light for accurate detection by the one or more photodiodes 282. The one or more photodiodes 282 may be positioned adjacent to an opening of the collector housing 280 to detect the conditioned and/or collimated light passing through the collector housing 280.

This conditioning or collimation of the light reflections may be accomplished in many ways. For instance, the structure of the collector housing 280 itself may condition or collimate the light reflections, such as reducing unwanted degradation of the reflected light, such as by interference. Referring to FIGS. 4 and 5, the collector housing 280 includes an outer wall 290 defining an internal cavity 292 there between. In some examples, the collector housing 280 may include a plurality of shelves extending inwardly from the outer wall 290 to define regions along the height or depth of the collector housing 280 having gaps of differing dimension there between. For instance, as shown in FIG. 7, the collector housing 280 may include first and second shelves 300, 302 extending inwardly from a first outer wall portion 304. The collector housing 280 may also include third and fourth shelves 310, 312 extending inwardly from a second outer wall portion 314 and towards the first and second shelves 300, 302, respectively. In such examples, a first gap $G_1$ may be defined between the first and third shelves 300, 310, with a second gap $G_2$ defined between the second and fourth shelves 302, 312. As shown, the first gap $G_1$ may be defined at or near the top of the collector housing 280. Similarly, the second gap $G_2$ may be defined at or near the bottom of the collector housing 280. As described below, the reflected light may pass through the first and second gaps $G_1$, $G_2$ of the collector housing 280 before being captured by the one or more photodiodes 282. Though FIGS. 4 and 5 illustrate the collector housing 280 having a plurality of shelves defining the first and second gaps $G_1$, $G_2$, in some examples, the shelves may be omitted such that the first and second gaps $G_1$, $G_2$ are defined between the first and second outer wall portions 304, 314. In other examples, the first and second gaps $G_1$, $G_2$ may be defined between the first and second shelves 300, 302 and the second outer wall portion 314, or between the third and fourth shelves 310, 312 and the first outer wall portion 304.

The collector housing 280 and its elements may be sized and shaped to reduce unwanted interference or otherwise condition and/or collimate the reflected light passing there through. For example, the collector housing 280 may be sized and shaped to reduce noise and provide a better signal characteristic for the one or more photodiodes 282. In one example, the collector housings 280 may absorb, whether by material, surface coating, or structure, any light that isn't directly incident on the photodiodes 282. More specifically, light impinging the walls of the collector housing 280 may be absorbed at least partially such that such light does not pass on to the photodiodes 282. In this manner, the light that hits the one or more photodiodes 282 may be only the un-interrupted reflected light to provide a better signal characteristic. For instance, as shown in FIGS. 4 and 5, the collector housing 280 may include an overall length $L_H$, an overall height $H_H$, and an overall width $W_H$. In addition, the collector housing 280 may include a sub-height $H_S$ extending between the first and third shelves 300, 310 and the second and fourth shelves 302, 312. Furthermore, the first and second shelves 300, 302 may extend away from the first outer wall portion 304 a first distance $D_1$, and the third and fourth shelves 310, 312 may extend away from the second outer wall portion 314 a second distance $D_2$. As shown in FIGS. 6 and 7, respectively, the structure of the collector housing 280 may define first and second dispersion angles $A_1$, $A_2$ defining the extent of light received by the one or more photodiodes 282.

As described herein, the various dimensions of the collector housing 280 may be tailored to achieve a desired characteristic of the light receiving assembly 104. For instance, the length $L_H$ and/or height $H_H$ of the collector housing 280 may be increased or decreased to cause corresponding increases or decreases in the first dispersion angle $A_1$. Similarly, the first and second gaps $G_1$, $G_2$ may be increased or decreased to cause corresponding increases or decreases in the second dispersion angle $A_2$. Increasing the dispersion angles $A_1$, $A_2$ may allow greater flexibility in capturing different swing paths of the moving object 101, such as allowing for vertical changes within the swing paths. For instance, the first dispersion angle $A_1$ may be large enough to capture vertical changes within the swing path between about 1:1 and about 15:1 relative to the distance between the first and second matched pairs 124, 144. However, decreasing the dispersion angles may increase the accuracy of the speed measuring device 100 in calculating the speed of the object 101 moving thereby.

Other dimensions of the collector housing 280 may be tailored to achieve similar results. For instance, the first distance $D_1$ and/or the second distance $D_2$ may be increased or decreased to reduce interference captured by the one or more photodiodes 282 based on the particular wavelength of light to be captured. In some examples, the thickness of the first, second, third, and fourth shelves 300, 302, 310, 312 may be tailored to achieve a desired ratio between the height $H_H$ and sub-height $H_S$ of the collector housing 280. In one example, the sub-height $H_S$ may be close to the height $H_H$ of the collector housing 280, such as within 90% of the height $H_H$, within 95% of the height $H_H$, or the like. As shown in FIG. 7, the collector housing 280 is symmetric across its width $W_H$, but may be asymmetric in some examples.

Referring to FIGS. 3-5, the one or more photodiodes 282 may be connected to a plate 330 attachable to the housing 160. Though each light receiving assembly 104 is shown to include a single photodiode 282, in some examples, each light receiving assembly 104 includes a plurality of photodiodes 282, such as two, three, or more than three photodiodes 282. As shown in FIG. 7, the one or more photodiodes 282 of each light receiving assembly 104 are positioned below the second gap $G_2$ of the collector housing 280. The one or more photodiodes 282 may be positioned relative to the collector housing 280 in many configurations. For instance, in examples with a single photodiode 282, the single photodiode 282 may be positioned centrally along the length $L_H$ and/or width $W_H$ of the collector housing 280. In some examples, though, the photodiodes 282 may be positioned in an off-centered relationship with the collector housing 280, such as being positioned closer to the first outer wall portion 304 or the second outer wall portion 314 of the collector housing 280, or the like. As described herein, the photodiodes 282 may be configured to generate a digital signal representing the light beams collected by the light receiving assemblies 104.

Referring to FIGS. 1-3, the speed measuring device 100 may include one or more displays arranged to display the speed of the object 101 moving between the first and second sensing zones 110, 112. In one example, the speed measuring device 100 includes a plurality of displays, such as first and second displays 350, 352, positioned on the housing 160. The first display 350 may be positioned on the first panel 190 of the housing 160. The second display 352 may be positioned on the second panel 192 of the housing 160. In this manner, the first and second displays 350, 352 may be positioned on opposing sides of the housing 160. As shown in FIG. 3, the first display 350 may be positioned between the first and second matched pairs 124, 144.

The first and second displays 350, 352 provide visual feedback to a user. For example, the first display 350 can provide visual feedback to a user on the first panel 190 of the housing 160, such as to a batter or player. The second display 352 can provide visual feedback to another user on the second panel 192 of the housing 160, such as to a coach. In some examples, at least one of the displays 350, 352 can act as an input element (e.g., a touch screen display) to enable a user to control, manipulate, and calibrate the speed measuring device 100. For instance, the second display 352 may act as an input element with the first display 350 operable to display information only, or vice versa. Each display 350, 352 may be any suitable display, such as a liquid crystal display, a plasma display, a light emitting diode display, an organic light emitting diode display, a cathode ray tube display, and/or a projector to project the image onto a surface. In examples where the display is used an input, the display 350, 352 may include one or more touch or input sensors, such as one or more capacitive touch sensors, a resistive grid, or the like. In this manner, a second user or bystander, such as a coach, may watch the user and the swing data displayed without being in the way. Additionally or alternatively, the second user, coach, or bystander may control or set-up the speed measuring device 100. In some examples, the device 100 includes feedback element 387 coupled to the computer device 384. The feedback element may include a light or lights or a sound making device, or both. The sound making device may include a speaker to generate feedback and provide it to the user(s). In some examples, the device 100 may include a speaker coupled to the computing device 384 to communicate feedback to the user in an audio signal. The audio feedback may include an issued tone or beep to indicate that the prior swing speed was recorded properly or was not recorded properly, that the system is ready to record an additional swing, to announce the value of the result, that the recorded swing speed was higher or lower than a target value, etc. In some examples, the feedback element is a light or visual indicator that may be positioned in or adjacent to the housing 160 separate from the display screens 350, 352, or it may be part of the information shown on the display screens 350, 352.

In some examples, a remote device 111, which may include a display, may be wired or wirelessly coupled to the device 100 to send or receive communications to the device 100. Example remote devices include a remote display or screen, computer, laptop, mobile phone, smartphone, mobile device, tablet, user interface, and the like. The remote device may be used to control, manipulate, and/or calibrate the speed measuring device 100. For instance, the remote device may act as an input element with the first display 350 or second display 352 operable to display information only, or vice versa. In some examples, both the remote device and the first display and/or second display may act as an input element, with the remaining first display or second display operable to display information only. In some examples, the remote device may be operable to display information only. In some examples, multiple remote devices are coupled to the device 100.

Figure 8:
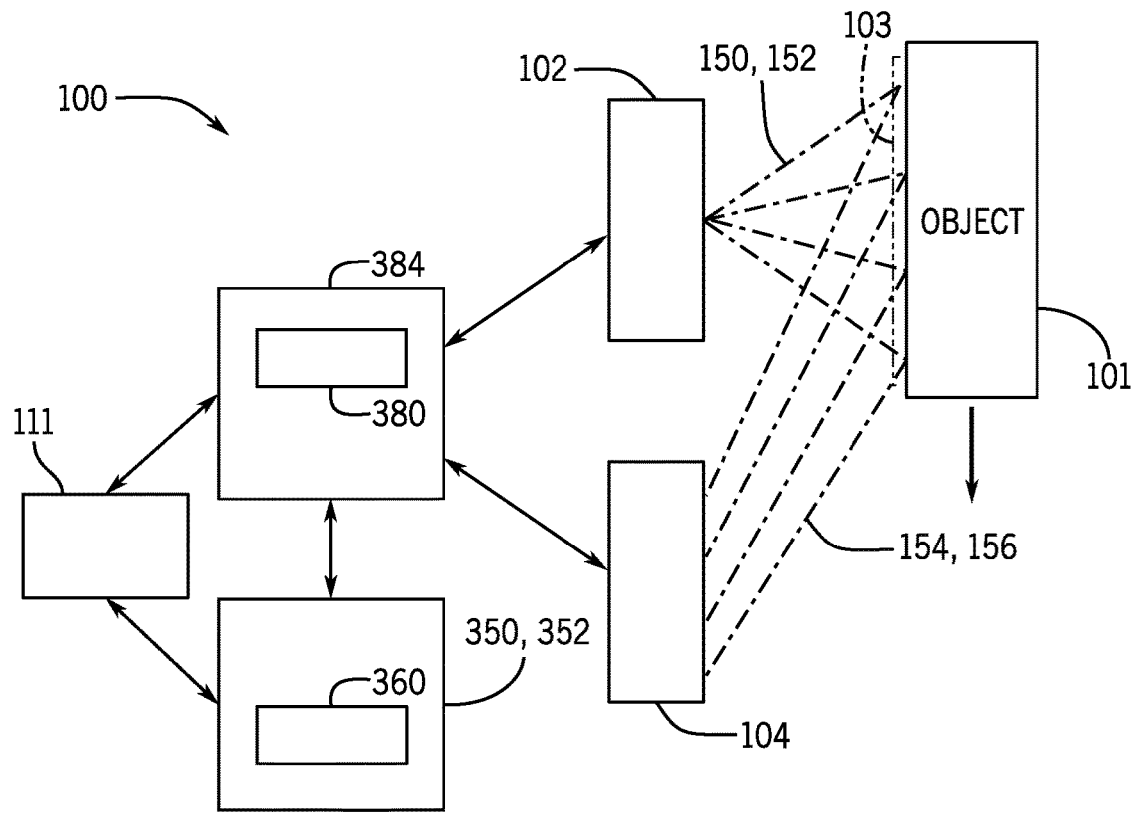
FIG. 8 is a schematic view of the speed measuring device according to some examples of the present disclosure.

As shown in FIG. 8, in some examples, the device includes at least one or both display 350, 352. Optionally, it may also include a remote device 111 to provide input, or receive data or outputs from the device 100. In some examples, the remote device 111 may include a display to show information and data collected, recorded, and analyzed from the device 100. In some examples, the device 100 does not include a display on the housing 160 and may be remotely setup, operated and controlled by the remote device 111, such as computer, laptop, mobile phone, mobile device, tablet, smart assistant, or user interface on a computing device. For example, the device 100 may be operated solely, for instance, by the remote device 111, such as a mobile phone. A coach may use the mobile phone to set up and operate the device 100 for a user. As the user uses the device 100, the coach may see the results on the mobile phone while the results are not visible to the user. In some examples, a user can set up a remote device, such as a mobile phone, to control the device 100, and use the mobile phone to operate the device 100. The mobile phone may display the measured data and may also record the data from the session for later review, display or to conduct data analysis on the remote device on the measured data. In some examples, the remote device may be used to update the computing device 384 of the device 100. A user interface as noted above may include a fixed monitor on a wall, in a kiosk, on a desk or other support near the speed measuring device, such as where the speed measuring device may be permanently or semi-permanently mounted. For instance, where the speed measuring device is mounted permanently or semi-permanently (removably secured), such as in a batting practice area, the remote device in the form of a user interface may be positioned on in a kiosk or on a desk. The user interface may be a computer, laptop, tablet computer, or other type of device.

Figure 18:
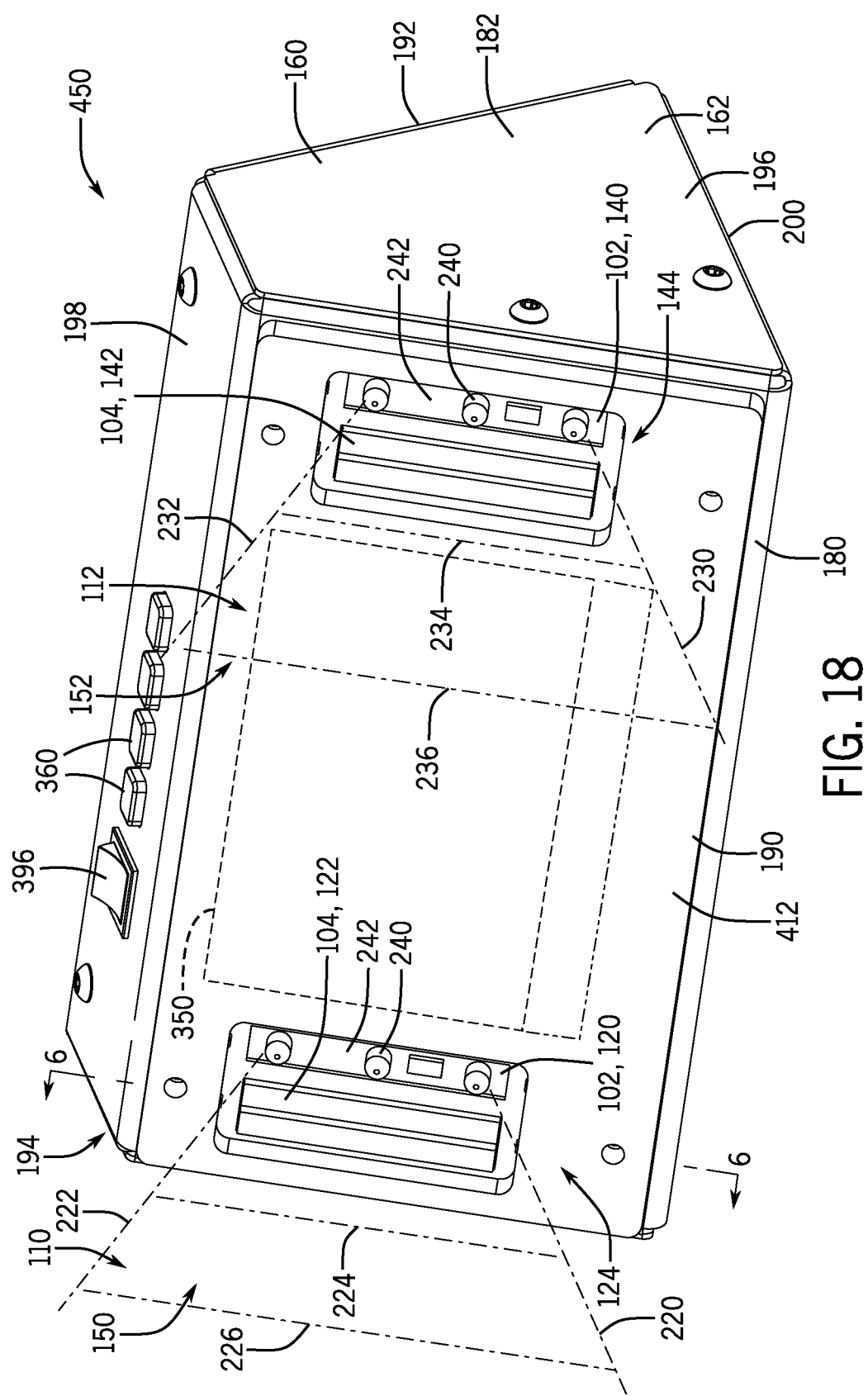
FIG. 18 is a top, front isometric view of an additional speed measuring device.

With continued reference to FIGS. 1-3, the speed measuring device 100 may include one or more input elements 360 to enable a user to control, manipulate, and calibrate the speed measuring device 100. The input elements 360 may be a touch screen display (such as the first display 350 and/or the second display 352), a joystick, one or more discrete buttons, or the like, with one or more input sensors operable to detect the actuation or movement of the input elements 360. The input elements 360 is electrically connected to the processing elements 380 and/or computing device 384 to provide input to the computing device for measuring the speed of the object 101, and/or change view settings of one of the first display 350 and/or the second display 352. For example, as shown in FIGS. 2 and 3, the input elements 360 may be connected to the housing 160 adjacent to, such as below, the second display 352. Additionally or alternatively, the input elements 360 may be connected to the housing 160 adjacent to the first display 350, such as shown in phantom lines in FIG. 3. The input elements 360 may be positioned or connected to other parts of the housing 160, such as along the top panel 198 of the housing 160, as shown on speed measuring device 450 of FIG. 18. The placement of the input elements 360 on the top panel may help to allow so that in use, a person on either side of the unit may program the unit. For example, a batter, positioned on one side of the device, and a person, such as a coach, positioned on the other side of the unit and watching the batter, can program the unit. As such, the input elements 360 may be connected to the housing 160 on a side different than that of the first and/and or second matched pairs 124, 144.

Figure 9:
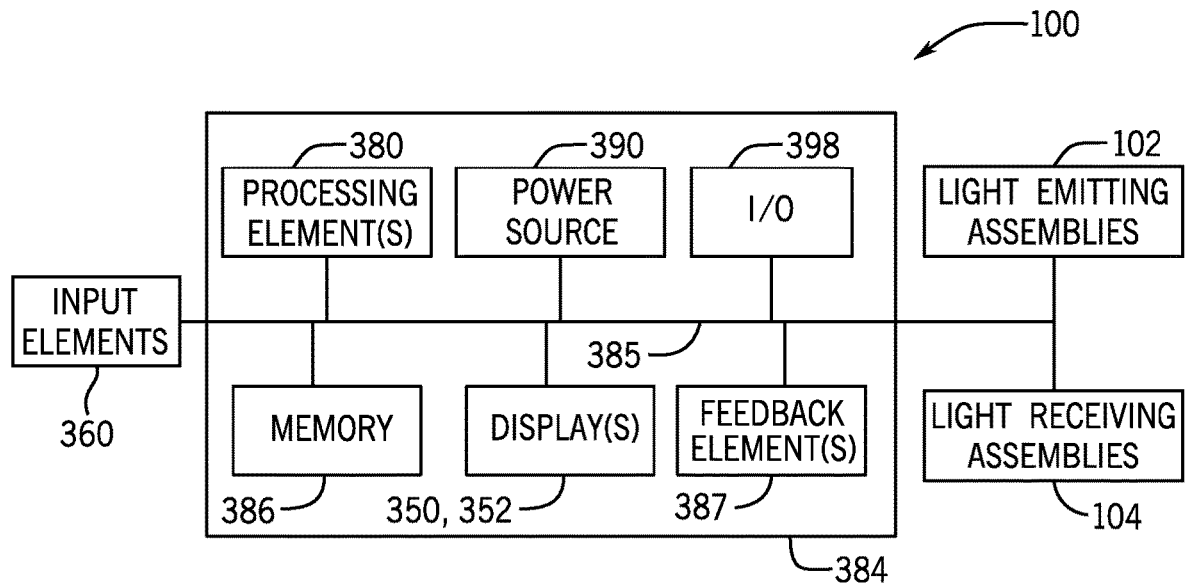
FIG. 9 is a simplified block diagram of the speed measuring device according to some examples of the present disclosure.

FIG. 8 is a schematic view of the speed measuring device 100. FIG. 9 is a simplified block diagram of the speed measuring device 100. Referring to FIGS. 6 and 7, the speed measuring device 100 includes one or more processing elements 380, which may be referred to simply as processors, as part of a computing device 384 configured to calculate a speed of the object 101 moving between the first and second sensing zones 110, 112. The one or more processing elements 380 and computing device 384 may be in electrical communication with the light receiving assemblies 104, the light emitting assemblies 102, the one or more displays 350, 352, and/or the optional remote device 111, either directly or indirectly (e.g., through a data transfer mechanism, wired connection, wireless connection, or the like).

The electrical communication(s) may permit the various elements of the speed gathering device to share and transport information (e.g., data) between the various elements. For example, the one or more processing elements 380 may receive and analyze data (such as light field data, light ray data, command instructions, among others, as explained below) from the light receiving assemblies 104, the light emitting assemblies 102, the one or more displays 350, 352, and/or the remote device 111 via the wired or wireless electrical communication between the one or more processing elements 380 and the components. The one or more processing elements 380 and/or computing device 384 may also transmit data and/or instructions (e.g., commands) to the light emitting assemblies 102, the light receiving assemblies 104, the one or more displays 350, 352, and/or the remote device 111, via the electrical communication between the one or more processing elements 380 and the components, such as to cause the light emitting assemblies 102 to begin emitting light, or the one or more displays 350, 352 to display analyzed data, among others.

In some examples, the one or more processing elements 380 may control one or more functions of the speed measuring device 100. In this manner, the one or more processing elements 380 may be associated with a computing device 384, such as a computer, a server, a tablet, a smartphone, or any other device capable of processing data. In some examples, the one or more processing elements 380 may be part of a computing system defined integrally with the speed measuring device 100, such as integrally with the light receiving assemblies 104 or any other component of the speed measuring device 100. In other examples, the one or more processing elements 380 may be part of a computing system physically separate from the speed measuring device 100.

In the examples of FIGS. 6 and 7, only one computing device 384 is shown; however, any number of computing devices 384 may be used. For the sake of convenience only, the description below will refer to a single computing device 384. Similarly, the description below will refer to a single processing element 380, though any number of processing elements 380 (which may or may not be in direct communication) is contemplated. Where appropriate, the description of the computing device 384 below can be applied to each computing device 384 of the speed measuring device 100. Similarly, the description of the processing element below can be applied to each processing element of the speed measuring device 100, where applicable. Thus, reference to "the processing element" may refer to the same processing element or processor or to a different processing element or processor within the speed measuring device 100.

Referring to FIG. 9, the computing device 384 may include the one or more processing elements 380, one or more memory components 386, a power source 390, the one or more displays 350, 352, one or more input/output (I/O) interfaces 398, and one or more feedback element(s) 387. The computing device 384 may also include other components typically found in computing systems, such as communication interfaces and one or more sensors, among others. Each element of the computing device 384 may be in communication via one or more system buses 385, wirelessly or the like. Each element of the computing device 384 will be discussed in turn below.

The processing elements 380 may be substantially any type of electronic device capable of processing, receiving, and/or transmitting instructions. For example, the processing elements 380 may be a microprocessor or a microcontroller. Additionally, it should be noted that select components of the computing device 384 may be controlled by a first processing element 380 and other components may be controlled by a second processing element 380, where the first and second processing elements 380 may or may not be in communication with each other. Additionally or alternatively, select functions may be performed by one processing element(s) with other functions performed by a different processing element(s), where the different processing elements 380 may or may not be in communication with each other. For instance, one processing element(s) may receive and analyze data received from the light receiving assemblies 104 with another processing element(s) functioning to display the analyzed data on the one or more displays.

The one or more memory components 386 store electronic data that is used by the computing device 384 to store instructions for the processing element, as well as to store data gathered by or inputted into the speed measuring device 100. For example, the one or more memory components 386 may store data or content, such as, but not limited to, data files, audio files, and so on, corresponding to various applications. The one or more memory components 386 may be magneto-optical storage, read only memory, random access memory, erasable programmable memory, flash memory, or a combination of one or more types of memory components 386.

The power source 390 provides power to the components of the computing device 384. Depending on the particular application, the power source 390 may be a battery, a power cord, or any other element configured to transmit electrical power to the components of the computing device 384. In examples utilizing a battery as a power source 390, the battery may be stored within the enclosed space 164 of the housing 160. In such examples, the battery or power source 390 may be attached to a platform 392 positioned within the enclosed space 164 (see FIG. 5). In some examples, the platform 392 may be coupled to the housing 160 in an elevated position by one or more dampers 394 to vibrationally isolate the battery (or any other component connected to the platform 392) from the housing 160 (see FIG. 5). The battery may be rechargeable, such as by line power or a solar module associated with the speed measuring device 100 or otherwise. The power source 390 may also provide a source of power to one or more external devices connected to the speed measuring device 100, such as a smartphone or a peripheral accessory. As shown, the speed measuring device 100 may include a power switch 396 to turn the device on or off. In some examples, the power switch may be positioned on a side panel of the device, as in FIG. 5, or on the top panel of the device, as in FIG. 18. In some examples, the speed measuring device 100 may include an auto-on feature, an auto-off feature, or both. For example, after a predetermined time without detecting a threshold movement of any object, the speed measuring device 100 may automatically shut off to preserve power.

The I/O interface 398 provides communication to and from the computing device 384, such as to or from the speed measuring device 100 (e.g., to or from other computing devices, auxiliary sensors, speakers, etc.). The I/O interface 398 may include one or more input buttons, a communication interface (such as Wi-Fi, Ethernet, Bluetooth, Bluetooth Low Energy chips, or the like), communication components (such as universal serial bus (USB) ports/cables), Near Field Communications (NFC) protocols or the like. Depending on the particular application, the speed measuring device 100 may be provided with the communication interface turned on or off. For example, base models of the speed measuring device 100 may have the communication interface turned off, with upgraded or premium versions of the device 100 having the communication interface turned on. In some examples, the communication interface and be turned on or off on the speed measuring device 100 itself (e.g., through a settings command or interface). In some examples, the speed measuring device 100 may include mechanisms preventing the communication interface to be turned on without additional measures (e.g., upgrade purchase, dealer or factory service, etc.).

The communication interface (e.g., Bluetooth) of the I/O interface 398 may be operable to communicate with other external computing devices, such as remote device 111, such as a smartphone, tablet, server, or web-based cloud service for storage, analysis, and/or display. In such examples, either the speed measuring device 100 and/or the optional external remote device 111 may be operable to store, analyze, and/or display data gathered by the speed measuring device 100. For instance, the speed measuring device 100 may transfer gathered data to a remote device 111 in the form of a desktop, laptop, smartphone or tablet, which may analyze the data (such as within an operating system application) and display the analyzed data to the user. In some examples, the remote device 111 may be utilized for display purposes only.

The communication interface of the I/O interface 398 may also permit the external device 111 (e.g., smartphone, tablet, etc.) to control the speed measuring device 100. For example, the smartphone or tablet may transmit instructions or commands to the speed measuring device 100 to control or set one or more operating parameters of the device 100, such as instructions or commands to begin collecting data, to remove any subset of data already collected, or the like. In this manner, the speed measuring device 100 and the external device 111 may be considered a system.

The speed measuring device 100 may include other features for convenience. For example, as shown in FIG. 4, the speed measuring device 100 may include one or more attachment structures 410 defined on the bottom panel 200 of the housing 160. The attachment structures 410 may be used to attach the speed measuring device 100 to an external device or structure, such as to a tripod or other stabilization device 411. The stabilization device 411 may be adjustable to position the speed measuring device 100 in a desired position relative to a user. For example, the speed measuring device 100 may be positioned such that a user's swing path moves the object 101 within the first and second sensing zones 110, 112. As shown in FIG. 3, a protective material or plate 412 may be placed over the first matched pair 124, the second matched pair 144, and the first display 350 to protect the components from damage. The protective material or plate 412 may be formed from transparent or translucent material.

Figure 10:
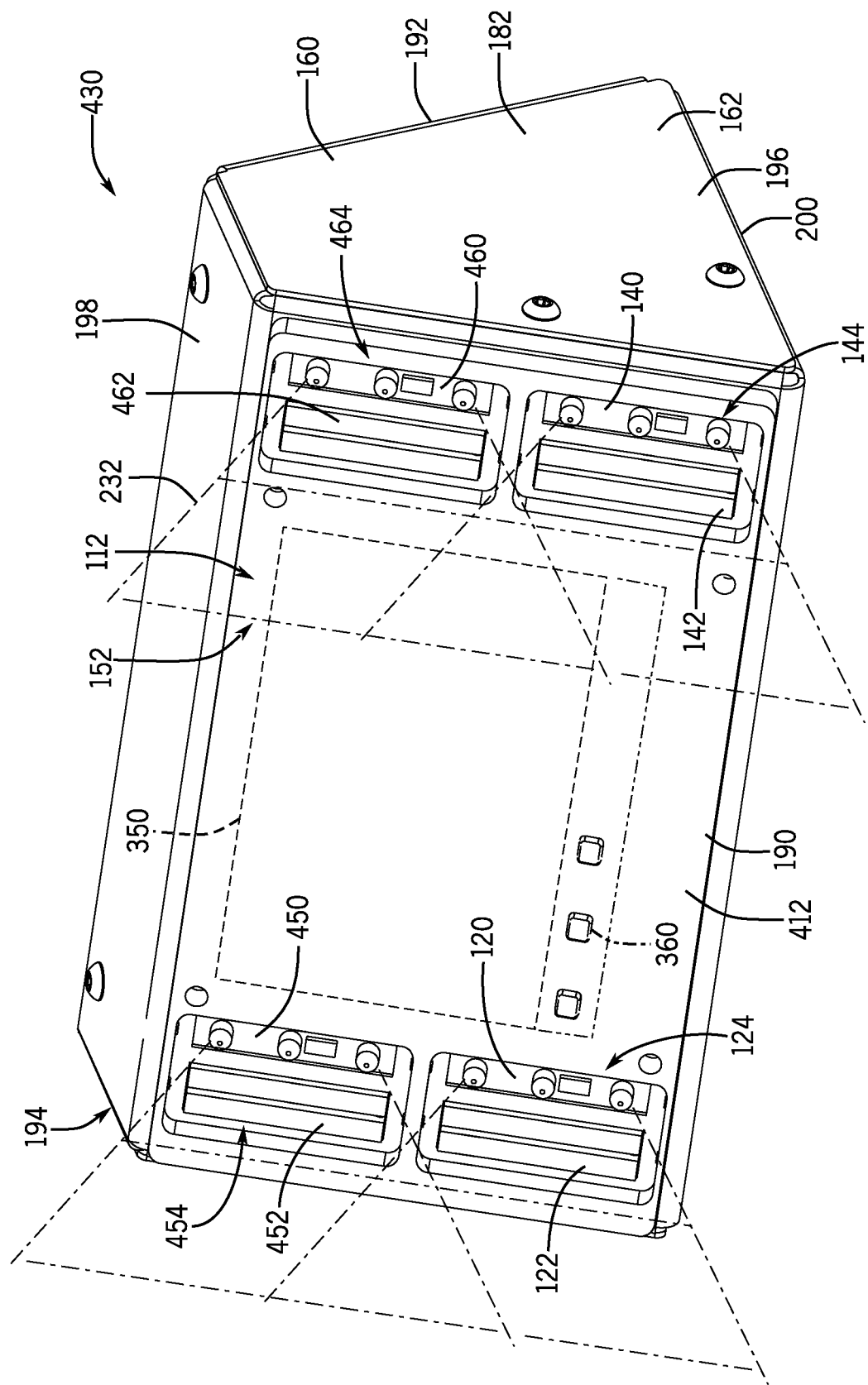
FIG. 10 is an isometric view of an additional speed measuring device according to some examples of the present disclosure.
Figure 11:
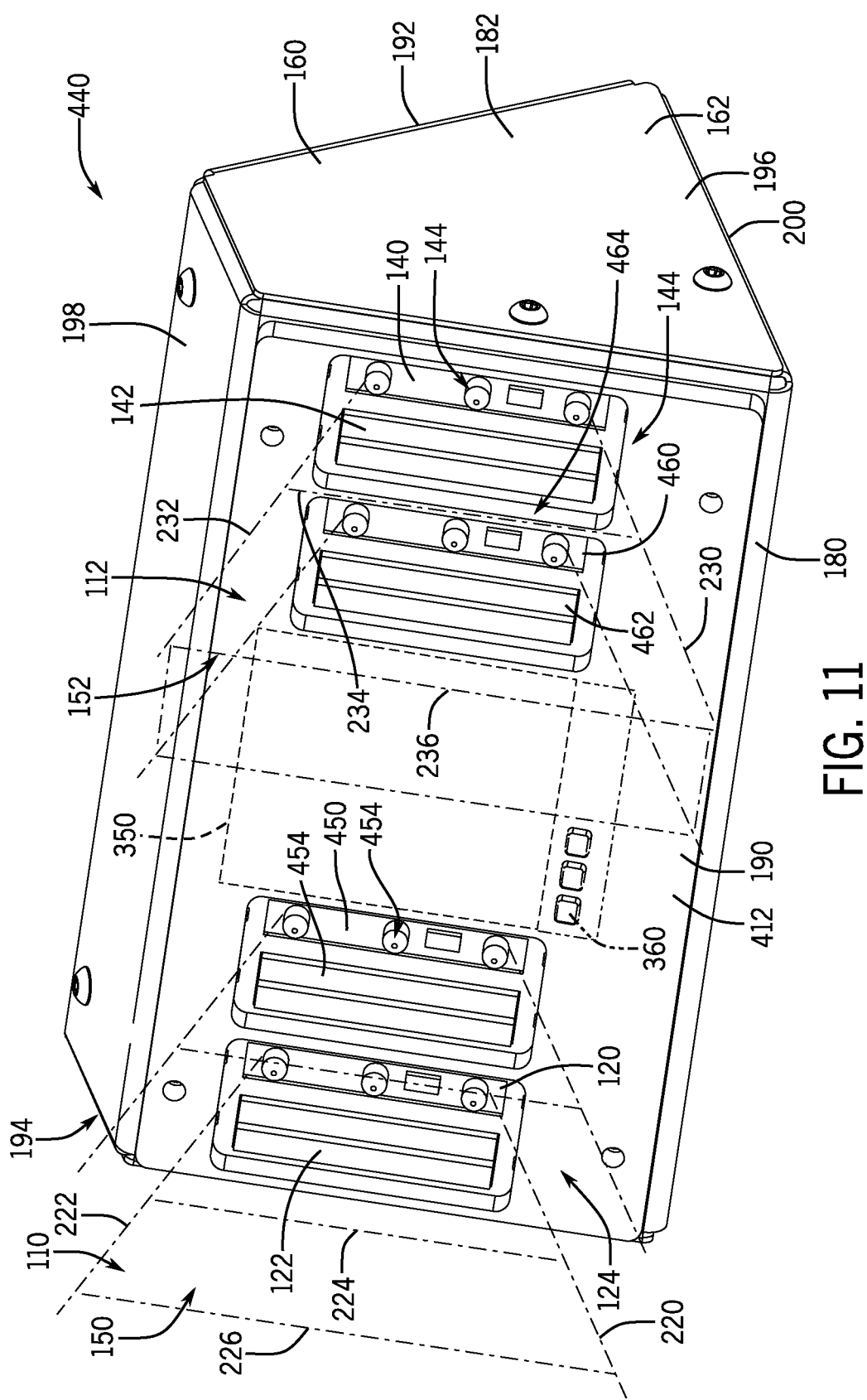
FIG. 11 is an isometric view of an additional speed measuring device according to some examples of the present disclosure

FIGS. 10 and 11 illustrate additional speed measuring devices 430 and 440, respectively. Except as otherwise noted below, the speed measuring devices 430, 440 may be similar to the speed measuring device 100 of FIGS. 1-9 described above. Thus, like features may not be described when they would be apparent to those of skill in the art in light of the description above and in view of FIGS. 10 and 11.

Referring to FIGS. 10 and 11, the speed measuring device 430 or 440 may include two or more matched pairs of a light emitting assembly 102 and a light receiving assembly 104 to detect the presence of the object 101 at each sensing zone. For instance, the speed measuring device 430 or 440 may include a third light emitting assembly 450 paired to a third light receiving assembly 452 to define a third matched pair 454. Similarly, the speed measuring device 430 or 440 may include a fourth light emitting assembly 460 paired to a fourth light receiving assembly 462 to define a fourth matched pair 464. The speed measuring device 430 or 440 may include additional matched pairs of light emitting assemblies 102 and light receiving assemblies 104.

In such examples, the first and third matched pairs 124, 454 may be configured to detect the presence of the object 101 when positioned at the first sensing zone 110. In this manner, the first and third matched pairs 124, 454 may increase the accuracy of detecting the object 101 at the first sensing zone 110, may increase the size of the first sensing zone 110 itself, and/or may provide redundancy to each other should one of the matched pairs fail. In like manner, the second and fourth matched pairs 144, 464 may be configured to detect the presence of the object 101 when positioned at the second sensing zone 112. Similarly, the second and fourth matched pairs 144, 464 may increase the accuracy of detecting the object 101 at the second sensing zone 112, may increase the size of the second sensing zone 112 itself, and/or may provide redundancy to each other should one of the matched pairs fail.

The mated or matched pairs 124, 144, 454, 464 may be arranged in many configurations. As shown in FIGS. 10 and 11, the first and third matched pairs 124, 454 may be connected to the housing 160 near the left panel 194. The second and fourth matched pairs 144, 464 may be connected to the housing 160 near the right panel 196. Depending on the particular application, the matched pairs may be arranged vertically or horizontally adjacent each other. For instance, as shown in FIG. 10, the first matched pair 124 may be positioned vertically adjacent to, such as above or below, the third matched pair 454. Similarly, the second matched pair 144 may be positioned vertically adjacent to the fourth matched pair 464. In such examples, the light fields produced by the first and third light emitting assemblies 120, 450 may be coextensive in the same vertical plane, with the light fields at least partially overlapping, though the light fields may not overlap in some examples. In like manner, the light fields produced by the second and fourth light emitting assemblies 140, 460 may be coextensive in the same vertical plane, with the light fields at least partially overlapping, though the light fields may not overlap in some examples.

Referring to FIG. 11, the first matched pair 124 may be positioned horizontally adjacent to the third matched pair 454. Similarly, the second matched pair 144 may be positioned horizontally adjacent to the fourth matched pair 464. In such examples, the light fields produced by the first and third light emitting assemblies 120, 450 may or may not overlap to define one or more sensing zones. In like manner, the light fields produced by the second and fourth light emitting assemblies 140, 460 may or may not overlap to define one more sensing zones.

Figure 12:
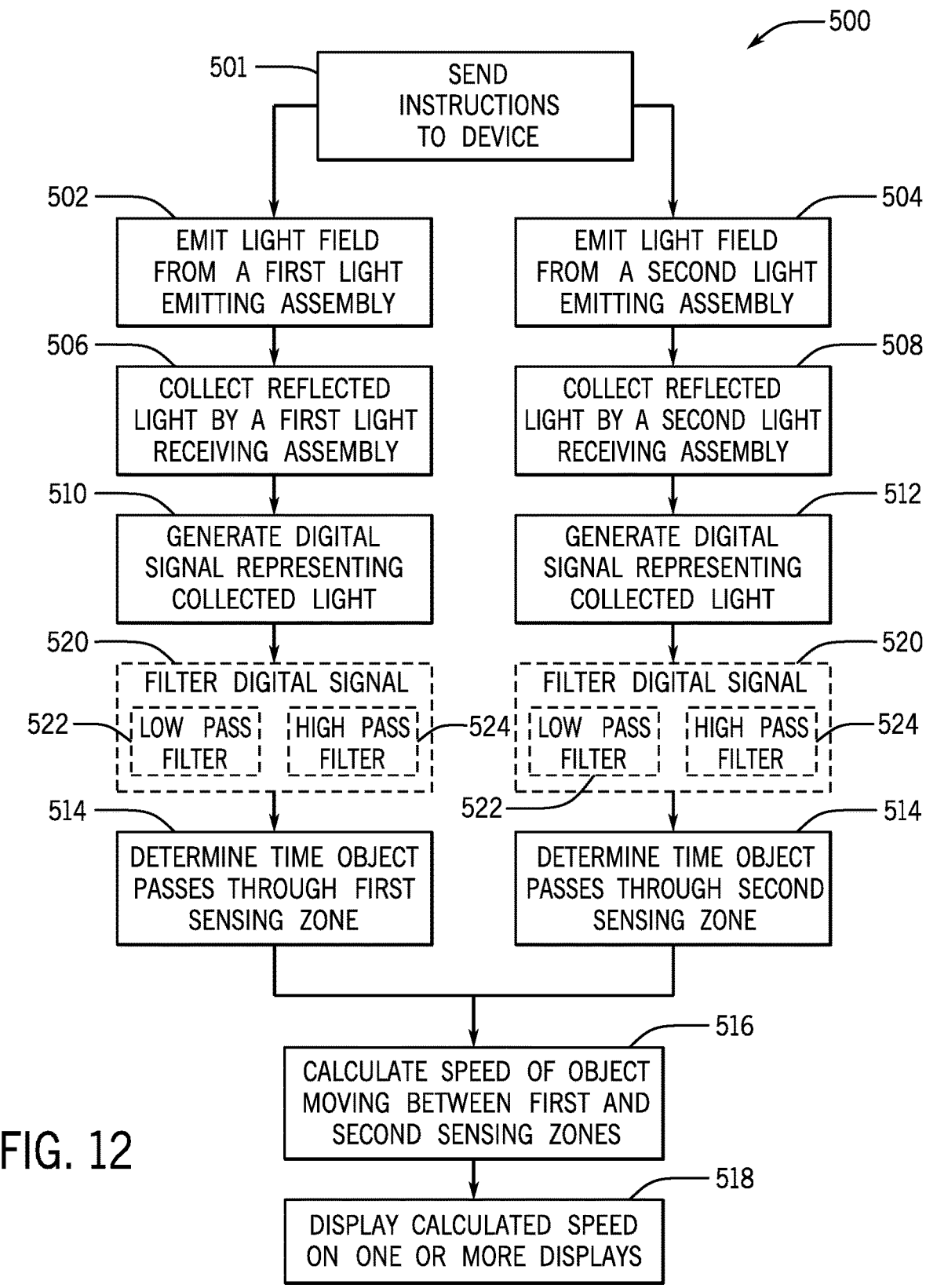
FIG. 12 is a flowchart illustrating a method of determining the speed of an object moving alongside a speed measuring device, such as the speed measuring device of FIG. 1, the speed measuring device of FIG. 10, or the speed measuring device of FIG. 11, according to some examples of the present disclosure.

FIG. 12 is a flowchart illustrating a method 500 of determining the speed of an object, such as object 101, moving alongside a speed measuring device, such as speed measuring device 100, 430, 440, or 450. Though the method 500 may apply to speed measuring devices 430, 440, and 450, for ease of reference, the following description will describe the method 500 with reference to the speed measuring device 100, unless otherwise noted.

Referring to FIG. 12, the method 500 may begin with emitting a first light field 150 by the light emitting diodes 240 of the first light emitting assembly 120 to define the first sensing zone 110 (Block 502). A second light field may also be emitted by the light emitting diodes 240 of the second light emitting assembly 140 to define the second sensing zone 112 (Block 504). As described above, the first and second light fields may be collimated at the first and second sensing zones 110, 112.

With continued reference to FIG. 12, the method 500 may include collecting by the collector housing 280 of the first light receiving assembly 122 light beams of the first light field 150 reflected by the object 101 passing through the first sensing zone 110 (Block 506). In particular, as the object 101 passes through the first sensing zone 110, light beams of the first light field 150 are reflected by the object 101 towards the first light receiving assembly 122. The reflected light beams may pass through the collector housing 280 of the first light receiving assembly 122 as described above. As shown in FIG. 10, the method 500 may include collecting by the collector housing 280 of the second light receiving assembly 142 light beams of the second light field 152 reflected by the object 101 passing through the second sensing zone 112 (Block 508). The second light receiving assembly 142 may collect reflected light similar to the first light receiving assembly 122 described above. In particular, as the object 101 passes through the second sensing zone 112, light beams of the second light field are reflected by the object 101 towards the second light receiving assembly 142. The reflected light beams may pass through the collector housing 280 of the second light receiving assembly 142 as described above. Depending on the particular application, only a portion of the light in the sensing zones may be reflected back to the light receiving assemblies 122, 142.

Continuing to refer to FIG. 12, the method 500 may include generating by the one or more photodiodes 282 of the first light receiving assembly 122 a digital signal representing the light beams passing through the collector housing 280 of the first light receiving assembly 122 and sensed by the one or more photodiodes 282 (Block 510). Similarly, the method 500 may include generating by the one or more photodiodes 282 of the second light receiving assembly 142 a digital signal representing the light beams passing through the collector housing 280 of the second light receiving assembly 142 and sensed by the one or more photodiodes 282 (Block 512).

With continued reference to FIG. 12, the method 500 may include determining by the processing elements 380 the times at which the object 101 passes through the first and second sensing zones 110, 112 based on the digital signals received from the photodiodes 282 (Block 514). For example, the processing elements 380 may analyze the digital signals received from the photodiodes 282 looking for key signal characteristics. In one example, the processing elements 380 may look for one or more signal spikes presented in the digital signals indicating the presence of the moving object 101 at the first and second sensing zones 110, 112. Depending upon the particular application, such as depending upon the type or shape of the moving object 101, the processing elements 380 may determine the times at which a peak, rising edge, or falling edge of the one or more signal spikes are presented in the digital signals. Depending on the particular application, the times may be determined after combining the digital signals from the first and second light receiving assemblies 140, 142, or, as shown in FIG. 12, each digital signal may be analyzed separately to determine the time the object 101 passes through the first and second sensing zones 110, 112, respectively.

Depending on the particular application, the processing elements 380 may sample the digital signals at a rate between about 10 kHz and about 40 kHz, such as between about 20 kHz and about 30 kHz. This sampling frequency may be adjusted based on the distance between the first and second sensing zones 110, 112. For instance, as the distance between the first and second sensing zones 110, 112 increases, the sampling rate may decrease. In like manner, as the distance between the first and second sensing zones 110, 112 decreases, the sampling rate may increase.

In some examples, the distance or spacing between the sensing zones 110, 112 may have a different dimension. Different spacing between the sensing zones may accommodate different object 101 being tested, shapes of motion of the object, or other characteristics. In some examples, the spacing between sensing zones 110, 112 may be a range inclusive of 6 and 8.5 inches. In some examples, the spacing between the sensing zones 110, 112 may be lower than 6 inches, such as 4 inches. In some examples, the spacing between the sensing zones 110, 112 may be larger than 8.5 inches, for instance up to and including 16 inches. In some examples, the spacing between the sensing zones is greater than 16 inches.

Continuing to refer to FIG. 12, the method 500 may include calculating by the processing elements 380 a speed of the object 101 moving between the first and second sensing zones 110, 112 (Block 516). Knowing the distance between the first and second sensing zones 110, 112, the speed of the object 101 can be calculated using the difference in times when the object 101 is detected at the first and second sensing zones 110, 112. Depending on the particular application, the processing elements 380 can calculate an instantaneous speed of the object 101 moving between the first and second sensing zones 110, 112, an average speed of the object 101 moving between the first and second sensing zones 110, 112 over a number of repetitions, a median speed of the object 101 moving between the first and second sensing zones 110, 112 over a period of repetitions, a maximum speed of the object 101 moving between the first and second sensing zones 110, 112, a minimum speed of the object 101 moving between the first and second sensing zones 110, 112, or other statistical analysis of the object's speed (such as standard deviation, extreme spread, etc.). The calculated speed(s) of the object 101 may be calculated and stored on the speed measuring device 100, calculated and stored on a remote device 111, or both. The calculated speed(s) of the object 101 may be calculated on the speed measuring device 100 and transmitted to the remote device 111, such as another computing device (e.g., a smartphone, tablet, server, or web-based service) for storage, analysis, and/or display. For example, the method 500 may include displaying the calculated speed on a plurality of displays, such as on the first and/or second displays 350, 352, and/or remote device 111, electrically coupled to or in communication with the processor (Block 518). In some examples, Block 518 may also include issuing feedback. Examples of issuing feedback may include issuing feedback from feedback elements 387, for example generating a noise from a speaker, and/or generating a visual indication, such as a light.

The method 500 may include other steps. For example, the method 500 may include filtering by the processing elements 380 the digital signals received from the first and second light receiving assemblies 140, 142 (Block 520). Depending on the particular application, the digital signals may be filtered after combining the digital signals from the first and second light receiving assemblies 140, 142 together, or each digital signal may be filtered separately (as shown in FIG. 10). As part of the filtering step, the digital signals may be filtered by passing the digital signals through a low pass filter (Block 522), through a high pass filter (Block 524), or both, whether collectively or separately. In this manner, the speed measuring device 100 may cut out swings that are too slow, too fast, or the like. In some examples, filtering the digital signals may include detecting a known carrier wave signal produced by at least one of the light emitting diodes 240. In some examples, the speed measuring device 100 may be operable to sense, such as by filtering or other means, movement of the object 101 from the first sensing zone 110 to the second sensing zone 112, from the second sensing 112 to the first sensing zone 110, or both. In this manner, the speed measuring device 100 may be programmed or otherwise configured to ignore an object 101 passing through the sensing zones backwards.

In examples utilizing third and fourth matched pairs 454, 464, the method 500 may include steps similar to those described above with respect to the components of the first and second matched pairs 124, 144. For instance, the speed measuring device 430 or 440 may emit light fields from the third and fourth light emitting assemblies 450, 460 to define the first and second sensing zones 110, 112 and/or other sensing zones relative to the housing 160. In such examples, the third and fourth light receiving assemblies 452, 462 may collect light reflected by the object 101 passing through the sensing zones. As light is collected by the third and fourth light receiving assemblies 452, 462, digital signals may be generated representing the received light. The processing elements 380 may analyze the digital signals received from the third and fourth light receiving assemblies 452, 462 to determine a speed of the object 101 moving past the speed measuring device 430 or 440.

As noted above, the data resulting from the operation of the third and fourth matched pairs 454, 464 may be used to refine the data resulting from the operation of the first and second matched pairs 124, 144. For instance, the data from the third and fourth matched pairs 454, 464 may be averaged with the data from the first and second matched pairs 124, 144, may be used to verify the data from the first and second matched pairs 124, 144 (e.g., is within a certain tolerance or threshold), or may be used in lieu of the data from the first and second matched pairs 124, 144 in certain circumstances.

The method 500 may include other steps, such as sending instructions to the speed measuring device 100 (Block 501), where the device 100 receives the instructions and begins emitting light fields from the first and second light assemblies (Blocks 502, 504). Depending on the particular application, the instructions may be sent to device 100 from another computing device, such as remote device 111.

The speed measuring device of the present disclosure uses the data collected from the movement of the object 101 to determine the speed of the object 101 as it moves through the distance between the sensing zones 110, 112. This data can be analyzed by the computing device 384 using appropriately programmed algorithms in order to determine the measured speed of the object. The general basis of the analysis performed by the algorithms in the processing elements is the distance traveled by the object divided by the length of time it took to travel that distance. Regarding the speed measuring device of the present disclosure, this is the measured length of time it takes the object 101 to travel the distance between the sensing zones 110, 112. The measured speed (as calculated by the speed measuring device) of the object 101 may be different than the actual speed of the object due to assumptions made in the algorithm used in the computing device 384. These assumptions may pertain to the shape of the movement of the object, the shape of the object itself, and/or about the data collected by the speed measuring device. The effect of these assumptions may affect the measured speed, but in some examples the effect on the measured speed may be known and generally repeatable and consistent across a useful range of speeds to be measured by the speed measuring device. This then makes the measured speed results comparable for use in training and monitoring changes in performance of the speed metric.

FIGS. 13-17 include details of design inputs for the speed measuring device, for example for the algorithm used by the computing device 384, in accordance with some examples of the present disclosure. FIGS. 13-17 relate to measuring the speed of the tip of a bat, but the model may be used for measuring the speed of other objects, such as a club, racket, stick, hurl, paddle, hammer, axe, or the like. In some examples, the device may include 2 sets of infrared (IR) emitting LEDs. Each set of IR emitting LEDs creates a sensing zone, for example sensing zone 110 or 112 as described above, which send IR radiation out to be reflected by a reflective spot or patch, such as reflector 103, on the tip or end 109 of a bat or object 101 passing in front of the measuring device 100 and through the sensing zones 110, 112. Photodiode collectors 282 receive the reflected IR radiation from the bat or object 101 as it passes through the view of each sensing zone. These reflective signals measure at least the time it takes for the object to move through distance between the sensing zones 110, 112. Using signal processing, and knowing the distance between the sensing zones 110 and 112, and the elapsed time it took the object to move that known distance, the device is able to determine the speed at which the tip of the bat is moving.

There are several geometric factors at play in the design of the system which may be considered and balanced to achieve the best system performance. System parameters may include the speed at which the system can take samples, which in some examples may be 50 kHz. Parameters may also include varying the shape and size of the reflector 103 on the tip of the bat or object 101. Parameters may include varying the distance between individual components that make up a single sensing zone 110, 112, such as varying the distance between the individual emitter LEDs, such as light emitting diode 240. Parameters may also include varying the location or orientation of the reflector 103 as it moves through and between the sensing zones. Parameters may also include varying the distance or spacing between the individual components, such as a collector or receiver, that form a single light receiving assembly 140, 142. The system parameters may also include varying the distance between the individual collector photodiodes 282, which may in some examples be about 6", 8", a distance smaller than 6", a distance greater than 8" and up to and including 16". These factors may be considered individually, or may be in combination of any two or more. In some examples, no reflector is used, or in other examples a reflector is used (whether integral or attached). In some examples, the reflector may have an overall shape that is optimized for the object the reflector is positioned on or coupled to, or for the physical activity the object is used within.

Figure 13:
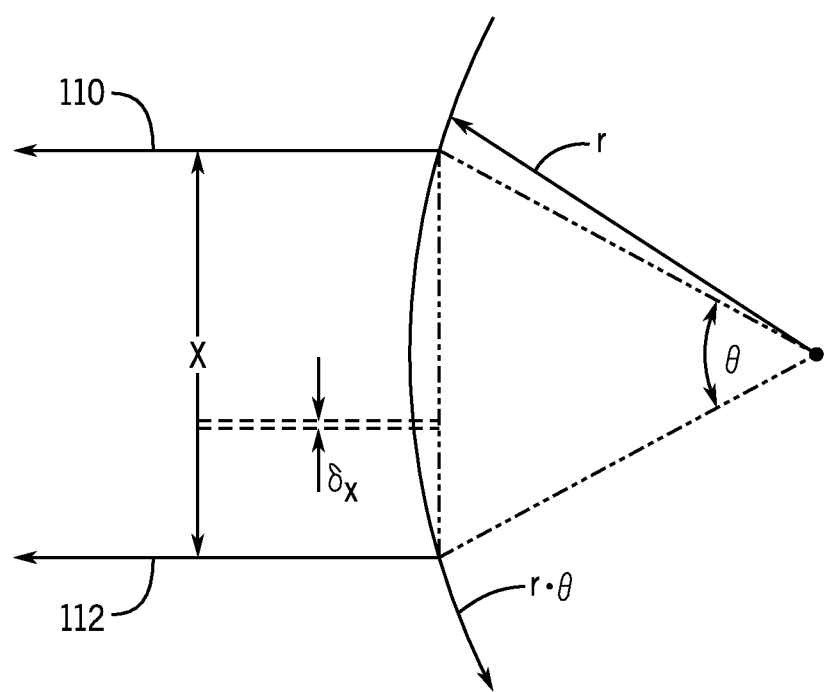
FIG. 13 is a schematic of a speed measuring device model geometry according to some examples of the present disclosure.

The diagram in FIG. 13 shows a simplified system geometry and assumptions for the model. The spacing between the field of view of the first sensing zone 110 and second sensing zone 112 is x, and the distance the tip of the bat moves between samples taken from the sensing zones is δx, which is dependent on how fast the bat is swung. The radius, r, of the bat swing is a combination of the bat length and the length of the swinging player's arms. The angle Θ the bat passes through between the sensing zones 110 and 112 is also dependent on the radius r and sensing zone spacing x. The true path length of the bat is r multiplied times Θ.

The model of the system makes some simplifying assumptions in order to calculate the speed of the object. In some examples, the model makes several assumptions, which may introduce a variance in the detected bat speed from the actual speed. For example, one assumption is that the bat tip moves in a straight line between the sensing zones, even though it actually moves along any of many differently curved paths, depending on how it is swung. Another assumption is that the centerpoint of the swing radius may be exactly between the two sensing zones, even though the player may be standing somewhat to either side. The system may, in some instances, be precise enough to always find the true center of the bat reflector to not more than one sample period error.

The sample period is also a variable that may be important. The system triggers the LED emitters at a particular rate and reads the output detected by the sensing zone at the same rate. Higher sample rates mean more data and more ability to see the bat moving past the sensing zones, even when the bat is moving very fast. In some examples, a maximum sample rate of 50 kHz (50,000 samples/second) may be achieved, while other examples may be operated at 25 kHz.

This sample rate may affect the accuracy (also referred to as "error") of locating the actual center location of the bat tip. Missing the data point from a single sample at either sensing zone 110 or 112 may introduce the largest source of inaccuracy in the system. In FIG. 13, the error due to a missing a single sample due to the sample rate is a simple percentage of δx divided by x multiplied by the actual bat tip speed. This error grows with increasing bat speed, but can be reduced by increasing the distance x between the sensing zones (see FIG. 14, triangle data point line).

However, the error due to the assumption of straight-line motion of the bat tip may increase with either increasing sensing zone spacing x or decreasing swing radius r. This is because as sensing zone spacing increases, swing angle Θ must also increase for a constant radius. Conversely, if radius decreases with constant sensing zone spacing, swing angle must also increase (see FIG. 14, square data point line).

Figure 14:
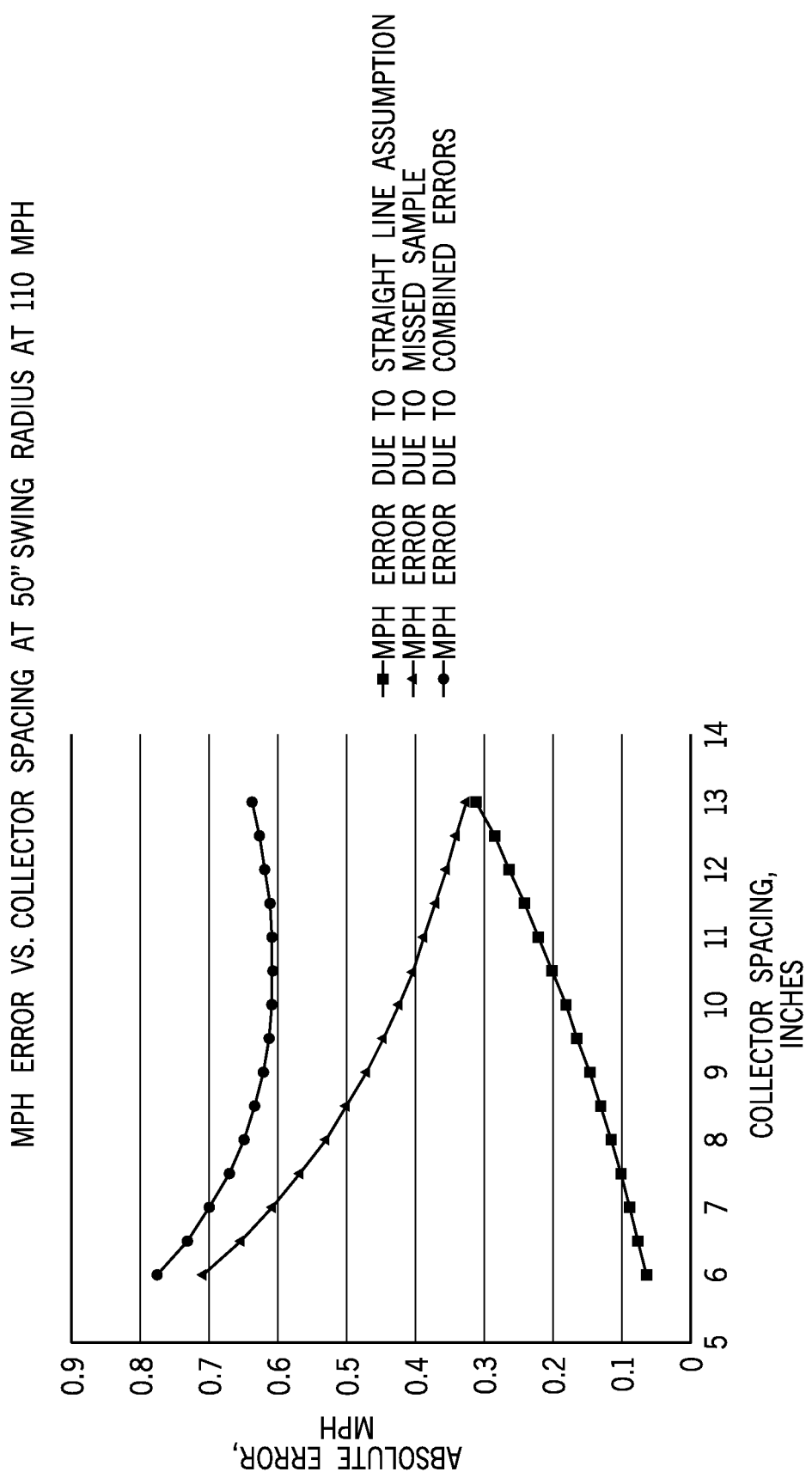
FIG. 14 is a chart including speed errors at 110 mph for various sensor spacing at a 50" swing radius according to some examples of the present disclosure.
Figure 15:
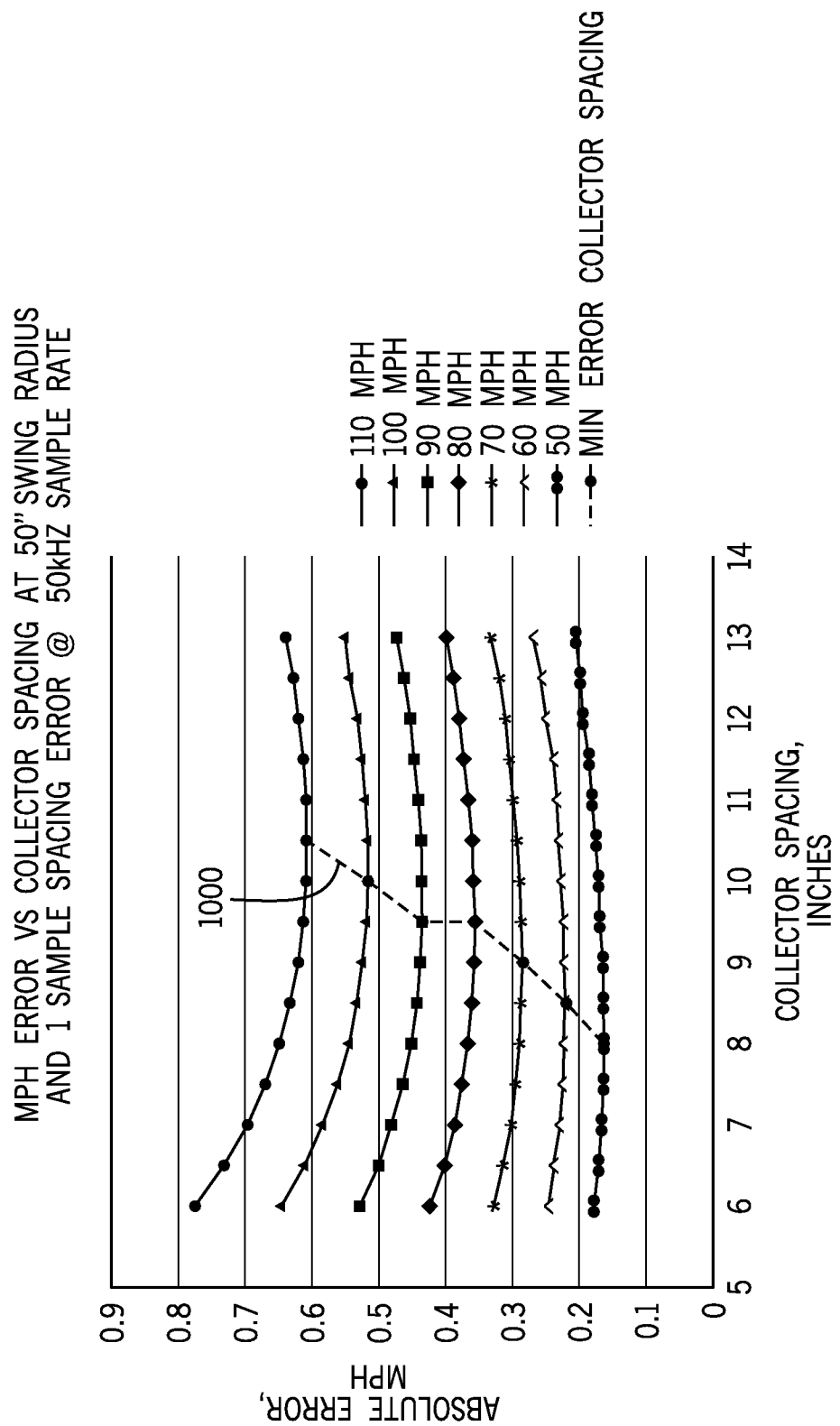
FIG. 15 is a chart including details of a 50" swing radius sensing zone spacing versus speed according to some examples of the present disclosure.
Figure 16:
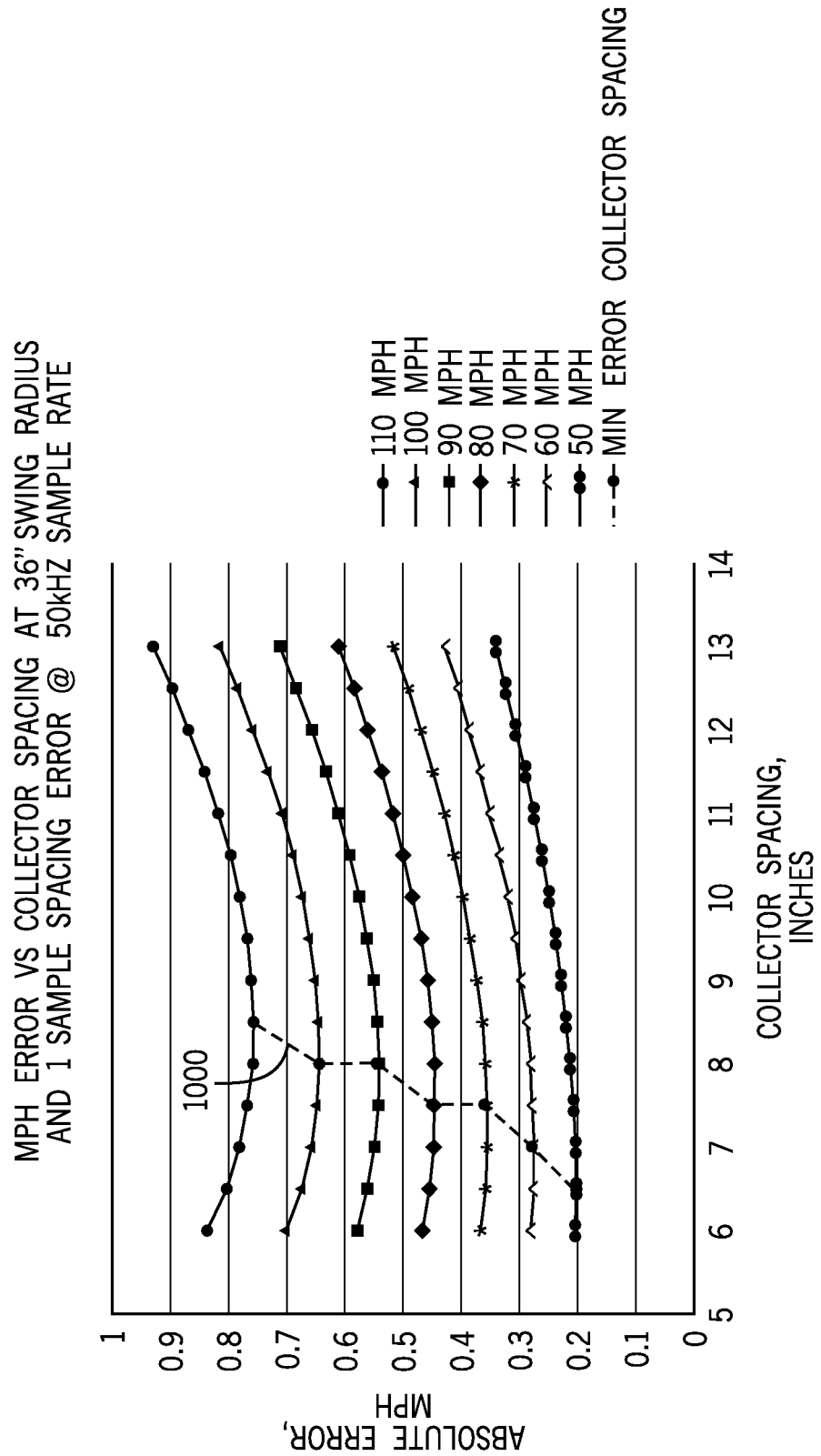
FIG. 16 is a chart including details of a 36" swing radius sensing zone spacing versus speed according to some examples of the present disclosure.

The total theoretical error of the speed measuring device system, in this example, is therefore dependent on a couple of different factors, and is the total of the missed sample and straight-line errors at any point (FIG. 14, circle data point line). There may be sensing zone spacing x for a given speed and swing radius that may provide a most accurate reading. In the case of an example design (approximately 6" sensing zone spacing) operating at 50 kHz, accuracy may be approximately ±0.77 mph, or within 1.54 mph at a bat speed of 110 mph. In other examples, accuracy may be approximately ±0.6 mph (1.2 mph total) at 110 mph. Accuracy may be increased by, for example, increasing sample rate, or by the system more precisely detecting the center of the radius r of the bat swing (also referred to as the bat center location).

Since there may be varying component configurations for the device 100 for various speeds and bat swing radii, an example study was made to show the optimum sensing zone spacing for swing radii of both 50" (a relatively normal adult) and 36" (a child). Bat speed was varied between 50 and 110 mph for both cases. As can be seen from FIG. 15 (50" radius) and FIG. 16 (36" radius), the component configuration for an ideal sensing zone spacing, shown by line 1000, may increase with speed and the system accuracy may be more sensitive for smaller bat swing radii. In some examples, the location 1000 at the corresponding speed is at the lowest point on the error curve, which may correspond to the most accurate reading and sensing zone spacing. Also it is worth noting that relatively quick gains in accuracy at high bat speeds may be realized by increasing sensing zone spacing from 6" to 8.5" in both radius cases.

Figure 17:
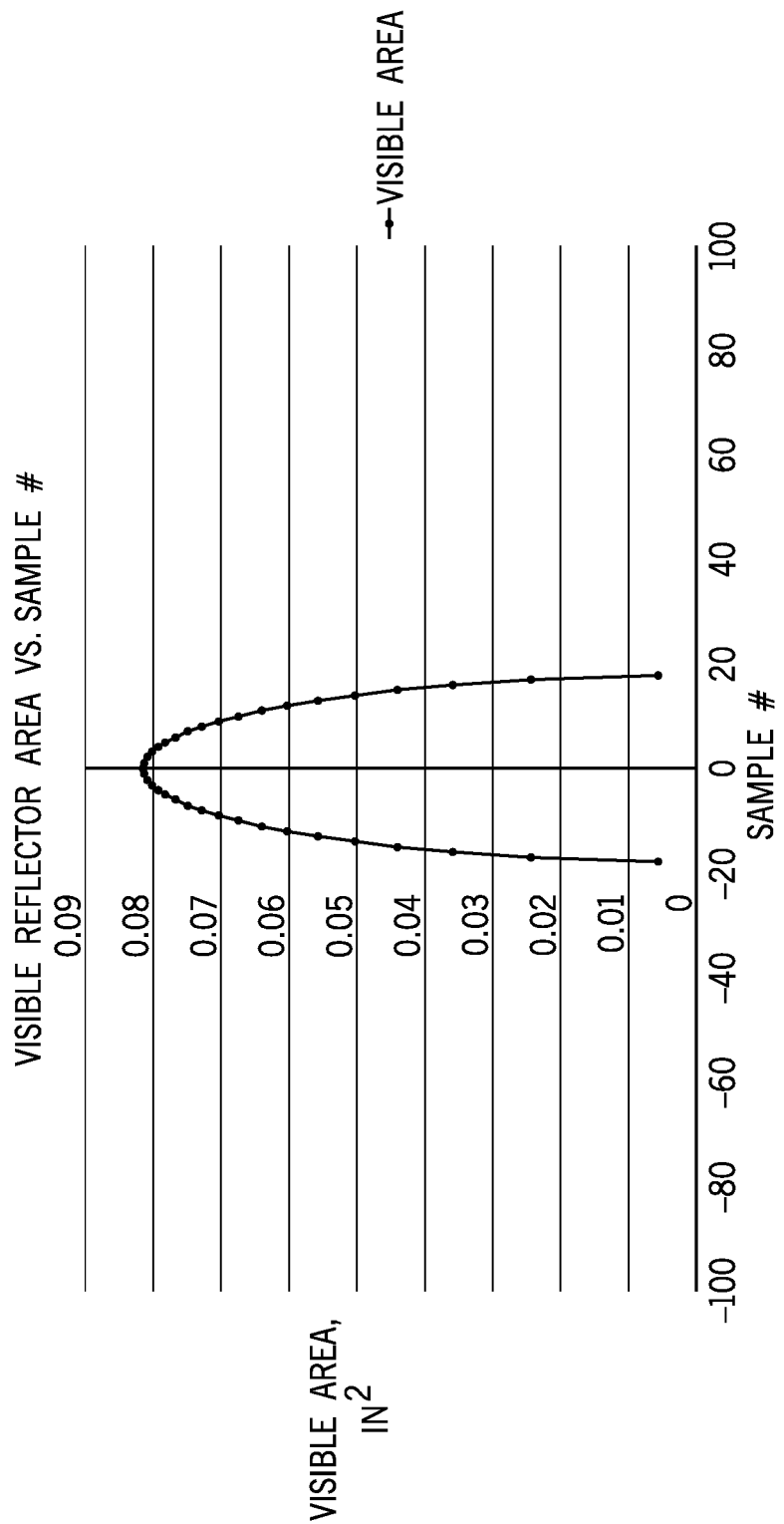
FIG. 17 is a chart including details of bat tip reflector area at locations offset from the center of a sensing zone, according to some examples of the present disclosure.

The last part of the model, such as in this example, may include a basic theoretical treatment of the bat reflector area visible to the sensing zone based on the width of the sensing zone window (0.059"), sample rate, and an assumed size, such as in this example the diameter of a circular shaped reflector on the bat tip. In some examples, signal strength losses due to varying distance between the bat tip and sensing zones may be factored in if desired using empirical correction factors derived from testing. In some examples, an ideal shape of the return signal is shown in FIG. 17. In FIG. 17, the center of the sensing zone is at "0" on the Sample # scale. This location in the sensing zone is where the visible area of the reflector is greatest and is directed at the receiving sensor, which results in a large amount of reflected light received by the sensor. In other words, where more of the reflector is facing the receiving or collecting sensor, more reflected light is sensed or collected by the sensor. As the reflector moves to either side of this center location (to the left is "−" and to the right is "+"), the reflector area exposed to the receiving sensor is caused to decrease and less reflected light is received.

For example, the visible area of the reflector may be the largest when the bat tip is closest to the center of the sensing zone (as shown by the apex of the curve in FIG. 17). Emitted light will directly reflect off of the reflector and back through the collector housing and into the collector at this location, with a small amount of light being deflected to areas outside of the collector. As the most amount of reflected light may be collected by the collector when the object 101 is at this position, the strongest signal may be formed when the bat tip is at this position. As the bat tip moves away from the center of the sensing zone, a smaller amount of reflected light is received by the collector, as the reflected light may be directed to areas outside of the collector. As the amount of reflected light is decreased, the signal strength associated with the reflection from the reflector is reduced. This shape may be modified somewhat by varying the angle of the bat tip to the sensing zones and by the distance between the sensing zones and bat tip reflector.

One aspect of the system may be to correctly find the exact middle of this signal curve, which may be affected by a weak return signal because of the distance of the bat tip from components of the measuring device or electrical noise in the system.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the structures disclosed herein, and do not create limitations, particularly as to the position, orientation, or use of such structures. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary. When items, structure or features are listed in sequence, it is intended, unless otherwise specifically noted, that each may be used separately or in any combination.

The above specification and examples provide a complete description of the structure and use of exemplary examples of the invention as defined in the claims. Although various examples of the claimed invention have been described above with a certain degree of particularity, or with reference to one or more individual examples, those skilled in the art could make numerous alterations to the disclosed examples without departing from the spirit or scope of the claimed invention. Other examples are therefore contemplated. It is intended that all matter contained in the above description and shown in the accompanying drawings shall be interpreted as illustrative only of particular examples and not limiting. Changes in detail or structure may be made without departing from the basic elements of the invention as defined in the following claims.

What is claimed is:

1. A speed measuring device comprising:
   a housing;
   one or more light emitting assemblies positioned at least partially within the housing and producing light at first and second sensing zones relative to the housing;
   first and second light receiving assemblies positioned at least partially within the housing and for receiving respective light reflections of the light when a moving object passes through the first and second sensing zones;
   a processor positioned within the housing and configured to calculate a speed of the object moving between the first and second sensing zones, wherein the first sensing zone and second sensing zone each has a vertical fan shape defined between a lower sensing line and an upper sensing line.

2. The speed measuring device of claim 1, wherein the one or more light emitting assemblies produce collimated light fields at the first and second sensing zones.

3. The speed measuring device of claim 1, wherein the one or more light emitting assemblies comprises:
   a first light emitting assembly comprising a first plurality of light emitting diodes paired to the first light receiving assembly; and
   a second light emitting assembly comprising a second plurality of light emitting diodes paired to the second light receiving assembly.

4. The speed measuring device of claim 1, wherein each light receiving assembly comprises:
   a collector housing; and
   one or more photodiodes positioned adjacent to the collector housing for detecting the light reflections passing through the collector housing.

5. The speed measuring device of claim 1, further comprising a plurality of displays electrically coupled to the processor to display the speed of the object moving between the first and second sensing zones.

6. The speed measuring device of claim 1, wherein the upper sensing line extends upwardly away from the housing.

7. The speed measuring device of claim 1, wherein the lower sensing line extends downwardly away from the housing.

8. The speed measuring device of claim 1, wherein the lower sensing line extends upwardly away from the housing.

9. The speed measuring device of claim 1, wherein an angle between the upper and lower sensing lines is between 15 degrees and 75 degrees.

10. A speed measuring device comprising:
    a first light emitting assembly forming a first light field at a first sensing zone;
    a first light receiving assembly for receiving and collimating reflection light when an object passes through the first sensing zone;
    a second light emitting assembly forming a second light field at a second sensing zone;
    a second light receiving assembly for receiving and collimating reflection light when the object passes through the second sensing zone; and
    a processor in electrical communication with the first and second light receiving assemblies and configured to calculate a speed of the object moving between the first and second sensing zones, wherein the first sensing zone and second sensing zone each has a vertical fan shape defined between a lower sensing line and an upper sensing line.

11. The speed measuring device of claim 10, further comprising a plurality of displays electrically coupled to the processor to display the speed of the object moving between the first and second sensing zones.

12. The speed measuring device of claim 10, further comprising a collector housing, wherein the first and second sensing zones are located along a length of the housing.

13. The speed measuring device of claim 10, wherein each of the first light receiving assembly and the second light receiving assembly comprises:
    a collector housing arranged to receive and collimate the reflection light received therein; and
    one or more photodiodes positioned adjacent to an opening of the collector housing to detect the collimated reflection light passing through the collector housing.

14. The speed measuring device of claim 13, wherein each light receiving assembly comprises a single photodiode.

15. The speed measuring device of claim 14, wherein the single photodiode is positioned centrally relative to a length of the collector housing.

16. The speed measuring device of claim 10, wherein the object includes a reflector;

wherein the light from the first light field is reflected off of the reflector as the object passes through the first sensing zone; and wherein the light from the second light field is reflected off of the reflector as the object passes through the second sensing zone.

17. A speed measuring device comprising:

a housing;

a first matched pair of a light emitting assembly and a light receiving assembly connected to the housing at a first position, the first matched pair configured to detect the presence of an object at a first sensing zone relative to the housing;

a second matched pair of a light emitting assembly and a light receiving assembly connected to the housing at a second position, the second matched pair configured to detect the presence of the object at a second sensing zone relative to the housing;

a processor configured to calculate a speed of the object moving between the first and second sensing zones;

a first display positioned on a first panel of the housing, the first display electrically coupled to the processor to display the speed of the object moving between the first and second sensing zones; and a second display positioned on a second panel of the housing, the second display electrically coupled to the processor to display the speed of the object moving between the first and second sensing zones.

18. A method of determining the speed of an object passing alongside a speed measuring device, the method comprising:

emitting by one or more light emitting diodes a first light field from a first light emitting assembly at a first sensing zone;

emitting by one or more light emitting diodes a second light field from a second light emitting assembly at a second sensing zone;

collecting by a first collector housing light beams of the first light field reflected by an object passing through the first sensing zone;

collecting by a second collector housing light beams of the second light field reflected by the object passing through the second sensing zone;

generating by one or more photodiodes a digital signal representing the light beams collected by the first light receiving assembly;

generating by one or more photodiodes a digital signal representing the light beams collected by the second light receiving assembly;

determining by a processor the times at which the object passes through the first and second sensing zones; and calculating by the processor a speed of the object moving between first and second sensing zones.

19. The method of claim 18, wherein collecting by a first collector housing light beams of the first light field reflected by an object passing through the first sensing zone comprises collecting light beams reflected by a reflector on the object.

\* \* \* \* \*